(12) United States Patent
Yao et al.

(10) Patent No.: US 9,017,440 B2
(45) Date of Patent: Apr. 28, 2015

(54) VORTEX DEVICE FOR SEPARATING COLD GAS AND HOT GAS

(75) Inventors: Qihuai Yao, Beijing (CN); Zhen Yao, Beijing (CN)

(73) Assignee: Beijing Rostar Technology Co. Ltd, Beijing (CN)

( * ) Notice: Subject to any disclaimer, the term of this patent is extended or adjusted under 35 U.S.C. 154(b) by 0 days.

(21) Appl. No.: 13/981,444

(22) PCT Filed: Jan. 5, 2012

(86) PCT No.: PCT/CN2012/000014
§ 371 (c)(1),
(2), (4) Date: Sep. 5, 2013

(87) PCT Pub. No.: WO2012/100636
PCT Pub. Date: Aug. 2, 2012

(65) Prior Publication Data
US 2014/0020348 A1 Jan. 23, 2014

(30) Foreign Application Priority Data

Jan. 26, 2011 (CN) .......................... 2011 1 0028383

(51) Int. Cl.
*B01D 46/00* (2006.01)
*B01D 45/16* (2006.01)
(Continued)

(52) U.S. Cl.
CPC ................ *B01D 45/16* (2013.01); *B01D 45/08* (2013.01); *B01D 45/12* (2013.01); *F25B 9/04* (2013.01)

(58) Field of Classification Search
CPC ........ B01D 45/16; B01D 45/08; B01D 45/12; B04C 5/04; B04C 5/13; F25B 9/04
USPC ................ 55/447, 413, 437, 418, 315, 459.1; 95/269, 34–35; 62/5, 408, 170
See application file for complete search history.

(56) References Cited

U.S. PATENT DOCUMENTS 3,786,643 A 1/1974 Anderson et al.
4,240,261 A 12/1980 Inglis
(Continued)

FOREIGN PATENT DOCUMENTS

CA 1014076 A 7/1977
CN 2502211 Y 7/2002
(Continued)

OTHER PUBLICATIONS

International Search Report for corresponding International Patent Application No. PCT/CN2012/000014 mailed Apr. 12, 2012.
Japanese Office Action for corresponding Japanese Patent Application No. 2013-550743 mailed Aug. 26, 2014; English translation.
Chinese Office Action for corresponding Chinese Patent Application No. 201110028383.X mailed Aug. 27, 2013. English translation.
Chinese Office Action for corresponding Chinese Patent Application No. 201110028383.X mailed May 27, 2014. English translation.

*Primary Examiner* — Dung H Bui
(74) *Attorney, Agent, or Firm* — Merchant & Gould P.C.

(57) ABSTRACT

A gas separating device includes a body defining a cylindrical inner chamber having a first and second ends; an intake and agitation fan disposed at the first end and drawing external gas into the inner chamber and agitates the external gas to form a first vortex traveling towards the second end; a hot gas stream discharge port located at or adjacent to an edge of the second end to discharge a part of gas of the first vortex; a vortex return device located at the second end to return the remaining gas of the first vortex not discharged from the hot gas stream discharge port, forming a second vortex traveling towards the first end through a cyclone core of the first vortex; and a cold gas stream discharge port located at a radial center of the first end or located adjacent to and around the radial center.

8 Claims, 11 Drawing Sheets

(51) Int. Cl.
*B01D 45/08* (2006.01)
*B01D 45/12* (2006.01)
*F25B 9/04* (2006.01)

(56) References Cited

U.S. PATENT DOCUMENTS

| | | |
|---|---|---|
| 4,356,565 A | 10/1982 | Shen |
| 4,397,154 A | 8/1983 | Bowers, Jr. |
| 2002/0073848 A1* | 6/2002 | Cho et al. .................. 95/271 |
| 2006/0150643 A1* | 7/2006 | Sullivan ........................ 62/89 |
| 2008/0133110 A1* | 6/2008 | Vetrovec ...................... 701/103 |
| 2009/0255272 A1 | 10/2009 | Tibell |

FOREIGN PATENT DOCUMENTS

| | | |
|---|---|---|
| CN | 1626990 A | 6/2005 |
| CN | 2713399 Y | 7/2005 |
| CN | 200975801 Y | 11/2007 |
| CN | 201969471 U | 9/2011 |
| KR | 2000-0031127 A | 6/2000 |

\* cited by examiner

VORTEX DEVICE FOR SEPARATING COLD GAS AND HOT GAS

This application is a National Stage Application of PCT/CN2012/000014, filed 5 Jan. 2012, which claims benefit of Serial No. 201110028383.X, filed 26 Jan. 2011 in China and which applications are incorporated herein by reference. To the extent appropriate, a claim of priority is made to each of the above disclosed applications.

BACKGROUND OF THE INVENTION

1. Field of the Invention

The present invention generally relates to an energy separating device, and particularly to a vortex type cold and hot gas separating device for separating a gas into cold and hot gas streams by using Ranque-Hilsch effect.

2. Description of the Related Art

Historically, the phenomenon of the Ranque-Hilsch effect is first found by Georges Ranque, a French metallurgical engineer, in 1930. At that time, Georges Ranque found in an experiment a vortex cooling effect in a cyclone separating device, i.e., a temperature at a center of a gas stream is different from temperatures of peripheral layers of the gas stream, the center of the gas stream has a lower temperature, while the outer edge of the gas stream has a higher temperature, in the cyclone separating device. According to this phenomenon, Georges Ranque subsequently designed a first vortex tube device which can separate energy in the history of mankind and filed a patent application in French in 1931. In 1933, Georges Ranque made a specific report about an experiment on the vortex tube device and its vortex separation effect of temperature in the French Physics Society. It is pointed out in the report that after a compressed gas with a temperature of 20° C. enters a vortex tube, a temperature of a cold gas stream flowing from the vortex tube is about −20 to −10° C. while a temperature of a hot gas stream flowing from the vortex tube can reach about 100° C., by the vortex separation effect of temperature. At that time, since a concept of a total temperature (stagnation temperature) of a fluid is confused with a concept of a static temperature of the fluid in Georges Ranque's expatiation upon a temperature separating phenomenon, the cold and hot gas separating phenomenon of the vortex tube was oppugned by scientists attending the meeting and generally negated in the meeting, finally resulting in interruption of further study on the vortex separation effect of temperature and the corresponding vortex tube device.

In 1945, Rudolph Hilsch, a German physicist, published a science report on the vortex tube which attracted the world's attention. In the science report, Rudolph Hilsch verified the vortex separation effect of temperature by using detailed material, and set forth a series of research findings and valuable advices for device design, application and a definition of temperature effect of the vortex tube. The vortex separation effect of temperature had not been formally accepted and acknowledged until then. Generally, the vortex separation effect of temperature is also named as the Ranque-Hilsch effect in memory of outstanding contributions of Georges Ranque and Rudolph Hilsch in this field.

So far, scientific research institutions, universities and enterprises of many countries have made a great deal of experiment research and theoretical explanation on the Ranque-Hilsch effect and a device for achieving it in the world. However, little progress has been made in both a basic theory and a device structure.

As shown in FIG. 1, a conventional vortex tube 10 is mainly composed of a nozzle 11, a vortex generating chamber 12, a vortex traveling tube (or called as a temperature separating tube) 13, a hot gas stream outlet 14, a cold gas stream outlet 15, and a vortex blocking and returning cone 16. According to a prevailing view in the prior art, when in operation, the vortex tube 10 jets a compressed gas into the vortex generating chamber 12 by an externally-disposed gas compressor (not shown in FIG. 1) through the nozzle 11; the gas jetted into the vortex generating chamber 12 first expands, and then enter the vortex traveling tube 13 at a very high speed in a tangent direction to travel in the form of a spiral vortex; and the traveling vortex is blocked by the vortex blocking and returning cone 16 before reaching the hot gas stream outlet 14, so that a portion of the gas stream will return in the form of a core vortex having a relatively smaller swirling diameter in an opposite direction, the unreturned gas is discharged through the hot gas stream outlet 14, and the returned gas is discharged through the cold gas stream outlet 15. Since the Ranque-Hilsch effect occurs in the gas in the vortex tube, a temperature of the gas of the outer-layer vortex discharged through the hot gas stream outlet 14 is higher than a temperature of the gas of the core vortex discharged from the cold gas stream outlet 15. Therefore, the gas stream discharged through the hot gas stream outlet 14 is named as a hot gas stream, and the gas stream discharged through the cold gas stream outlet 15 is named as a cold gas stream. Those skilled in the art could realize that the so-called hot and cold gas streams should not be limited to those having temperatures higher or lower than an absolute temperature value, but the gases flowing from the two gas stream outlets are defined relative to each other. In other words, concepts of the terms "hot gas stream" and "cold gas stream" are clear and definite in the art.

Although the vortex tube device is very simple in both structure and operation, an energy exchange process of the Ranque-Hilsch effect occurring in the device is extremely complicated. A heat transfer process is irreversible as a result of internal friction. Furthermore, the scientific community generally thinks that what the gas performs in the vortex tube device should be a complicated three-dimensional compressible turbulent flow. Therefore, so far, a mathematical model by which performance of the vortex tube device can be accurately predicted has been unable to be given in application of the Ranque-Hilsch effect. Explanations of the Ranque-Hilsch effect by the scientific community are also various, the scientific community has not yet set forth a very satisfying theoretical explanation of the Ranque-Hilsch effect, and even views of some theories themselves conflict with each other, in the basic theory. It can be said that theoretical research on the Ranque-Hilsch effect is a major problem currently confronted by the scientific community.

What is currently prevailing in the industry is a kinetic energy conversion theory with respect to cold and hot gas separation principles of the Ranque-Hilsch effect. The kinetic energy conversion theory is as follows.

The gas stream in the vortex tube device performs complicated motion. Specifically, the gas of the outer-layer vortex moves towards the hot gas stream outlet, the gas of the core vortex moves towards the cold gas stream outlet, the two vortexes rotate in the same direction, and it is particularly important for the two vortexes to rotate at the same angular velocity. Although there is violent turbulent flow in a boundary region between the gases of the two vortexes from the beginning to the end, the two vortexes can be regard as being integral from the point of view of rotational motion. The core vortex is enslaved to the outer-layer vortex. Therefore, the core vortex is a driven vortex, while the outer-layer vortex is a driving vortex. Water swirling flow generated in a bathtub is taken as an example to make a visual explanation. When discharging water, the water moves towards a core portion of an outlet and a rotational speed of the water will increase in order to conserve its angular momentum. A tangential linear velocity of particles in the water swirling flow is inversely proportional to a radius of the swirling flow. Therefore, when a radius of a driving vortex is reduced to a half as the particles in the water swirling flow move towards the core portion of the outlet, the tangential linear velocity, along the swirling, of the particles of the driving vortex is doubled, while the tangential linear velocity, along the swirling, of the particles of a driven vortex maintained at a certain rotational angular velocity is decreased by a half. The particles of the driving vortex flow into a sewage draining port at a linear velocity that is four times as large as that of the particles of the driven vortex. The kinetic energy is directly proportional to the square of the linear velocity. Therefore, in this example, the kinetic energy of the particles of the driven vortex which flow into the sewage draining port is only 1/16 of the kinetic energy of the particles of the driving vortex which flow into the sewage draining port. The prevailing conventional theory holds that the situation in the vortex tube in which the cold and hot gases are separated is similar to the above example. Where does a kinetic energy difference between the gas of the driven vortex and the gas of the driving vortex which totals to 15/16 of the available kinetic energy go? The conventional theory considers that this is just a key in exploration of the cold and hot gas separation principles in the Ranque-Hilsch effect, i.e., the kinetic energy difference will be transferred from the driven vortex in the core to the driving vortex in the outer layer in the form of heat. Thus, the gas of the driven vortex becomes the cold gas stream, while the gas of the driving vortex becomes the hot gas stream! The energy relationship between them is in accord with the law of conservation of heat and the law of conservation of energy.

Apparently, the above theory does not directly answer the question from microcosmic essence of a fluid temperature, but gives only a general explanation in a macroscopic aspect of the law of conservation of heat and the law of conservation of energy. Cognition on microcosmic essence of the Ranque-Hilsch effect is not deep. Hence, this also has led to the fact that all of the devices for achieving cold and hot gas separation by using Ranque-Hilsch effect have been limited to only the above-mentioned basic structure of the vortex tube for a long time. In addition, it is not clear with what geometric dimensional relationship of the structure in such basic structure a maximal difference between the temperatures of the cold and hot gas streams can be obtained. In other words, it is unclear with what geometric dimensional relationship an optimal cold and hot gas separation effect can be obtained. However, even for the basic structure of the conventional vortex tube, the number of design variables is up to at least 15, and each of the variables has infinite selections. Since influences of each variable and a relationship between the variables on an effect of the vortex tube are substantially all unknown or indefinite, the basic structure of the vortex tube device has not been improved much for a long time.

Particularly, the conventional vortex tube devices all demand that compressed gas having a very large pressure be used and require that the compressed gas be jetted into the vortex generating chamber 12 to expand at a high speed, then the gas expanding at the high speed enters the vortex traveling tube 13 having a smaller diameter to generate high-speed vortex, and finally the cold and hot gas separation be achieved by means of the Ranque-Hilsch effect. Under the guidance of the existing theory that is not clear enough, a person having ordinary skill in the art generally considers that in the vortex tube device, an inner diameter of the vortex traveling tube 13 should not be too larger since he is generally of the opinion that in order to obtain a maximal difference between the temperatures of the cold and hot gas streams, a ratio of a length of the vortex traveling tube 13 to the inner diameter (usually the ratio is also called as a length to diameter ratio of the vortex tube for short) should be larger, and further considers that the length to diameter ratio should be preferably larger than 10, and even larger than 45. In other words, in the state of prior art in the technical field, a person having ordinary skill in the art generally considers that the length of the vortex traveling tube 13 should be preferably longer, while the inner diameter of the vortex traveling tube 13 should be preferably smaller on such condition that the vortex can be generated and the return of the core vortex can be achieved.

In addition, the vortex tubes in the prior art generally all require that a gas compressor or a similar apparatus be used for supplying compressed gas. The vortex tubes are larger in assembled equipment, have a smaller output, and suffer from big limitation of an application field. Typically, a vortex tube on sale has a small diameter of around 30 mm and a length of around 300 mm so that its internal volume is very small. When in operation, compressed gas is jetted into the vortex tube at a speed close to the sound velocity such as a speed between Mach 1/3 and Mach 7/8. A nominal temperature of the vortex tube labeled by the manufacturer indicates that cold gas stream having an ultralow temperature of down to −60° C. can be separated by the vortex tube. However, the vortex tube device generates strident noise and has extremely high energy consumption when in operation since it requires that a great deal of compressed gas be used. It can be found through further research that since the internal volume of the vortex tube is very small, a phenomenon of sharp decompression, expansion, and temperature drop will occur in the compressed gas jetted from the nozzle when excessive gas enters the vortex tube. The phenomenon of decompression, expansion, and temperature drop is physically referred to as the Joule Thomson cooling process. The Joule Thomson cooling process does not have necessary direct relations with the Ranque-Hilsch effect, but in fact it is a main reason why this kind of devices obtain cold gas stream.

The inventor of the present application has creatively realized that the existing theoretical unknown has directly led to the following defects that generally exist in the existing vortex tubes for separating cold and hot gases:

1. it is necessary to use a gas compressor or a similar apparatus for supplying compressed gas having a large pressure, and sharp expansion itself of the compressed gas will cause temperature drop, loud noise, and low efficiency;

2. it is necessary to dispose a big vortex generating chamber for expansion of the compressed gas, and only a part of the gas can enter the vortex traveling tube in a tangent direction to form vortex, so that the efficiency is low;

3. the diameter of the vortex tube is too small and a gas disk of a swirling is too small, and time of a cold and hot gas separation process is too short, so that the cold and hot gas separating function cannot be brought into full play;

4. the vortex blocking and returning cone will generate a great deal of useless turbulent flow in a tail of the vortex traveling tube so as to reduce the efficiency of the device; and 5. the structure of the existing vortex tube device is not suitable for manufacturing a large vortex type cold and hot gas separating device, e.g. a vortex type cold and hot gas separating device with a large aperture (having a diameter more than hundreds of millimeters, for example) which has a large air quantity and a low wind speed.

SUMMARY OF THE INVENTION

The inventor of the present application realizes that only if mechanism of how to succeed in separation of the cold and hot gas streams in the Ranque-Hilsch effect is further explored, the current relatively blind state and even some ideological shackles in the prior art can be broken through, and a device for achieving separation of the cold and hot gases by means of the Ranque-Hilsch effect which has a brand-new structure can be conceived.

In 1845, J. P. Joule, an English physical scientist, completed the famous Joule free expansion experiment for studying internal energy of gas, and set forth the principle that the temperature of a compressible fluid can be changed by changing a pressure of the compressible fluid. The inventor of the present application considers that it is probably of more help to technical personnel to cognize the essence of the Ranque-Hilsch effect according to this principle. When an ideal gas disk of the vortex (which also can be referred to as a gas disk for short) is constrained in a space in a cylindrical wall, a diameter of the gas disk cannot be infinitely expanded by a centrifugal force. Therefore, a group of particles of the gas will rotate along an inner wall surface of the cylinder. A centrifugal force generated by high-speed rotation will form an increased gas pressure in the limited space. Thereby a temperature of gas of an outer layer of the vortex will rise with increase of the pressure, while a temperature of gas of a core of the vortex will lower with decrease of the pressure.

It can be known from the above cognition of the cold and hot gas separation by the swirling that as long as flow of gas is changed to a vortex gas stream rotating at a high speed, it is hopeful to separate cold gas stream from a center portion of the vortex gas stream and hot gas stream from an outer peripheral portion of the vortex gas stream by the cold and hot gas separation effect of the swirling.

In addition, the inventor of the present application also realizes the following two prospects for a gas disk rotating freely in a space. Firstly, a very large centrifugal force or rotational speed is not needed. As long as an enough time has elapsed, an instantaneous velocity of particles of the gas disk which has increased under the influence of the centrifugal force for a period of time can generate enough influence on the gas pressure, and thus the gas temperature. Secondly, a very large circumferential tangential linear velocity of the rotation is not needed. As long as a diameter of an orbit along which particles of the gas disk of the swirling rotate is small enough, a centrifugal force which is capable of generating enough influence on the gas pressure also can be generated, thereby generating enough influence on the gas temperature.

In synthetic consideration of various theories and the creative cognition of the inventor of the present application, the inventor of the present application opines that:

1. it is possible to enhance the cold and hot gas separation effect by prolonging time of rotation of the vortex;
2. it is possible to enhance the cold and hot gas separation effect by enlarging a diameter of rotation of the vortex; and
3. it is possible to enhance the cold and hot gas separation effect by contracting a diameter of rotation of the vortex at the same circumferential tangential linear velocity of the rotation.

In addition, the inventor of the present application has sufficiently recognized that when the vortex type cold and hot gas separating device is used, people hope that it can be used as a cooling wind generation device for changing an environmental temperature in many situations in their daily lives. In this case, what people hope to obtain is gas having a temperature that is not too low such as a temperature of about 20-30° C. which enables a human body to feel comfortable, a large air quantity, and a low flow speed, and certainly people also wish the vortex type cold and hot gas separating device has a simple structure and low noise, and does not required that compressed gas be used. This puts forward new requirements for a structure of the vortex type cold and hot gas separating device using the Ranque-Hilsch effect, and especially for design and manufacture of a vortex type cold and hot gas separating device with a large aperture (having a diameter of up to more than hundreds of millimeters, for example) which has a large air quantity and a low wind speed.

The present invention has been made to overcome at least one of the defects in the prior art. It is an object of the present invention to provide a vortex type cold and hot gas separating device having a new structure.

It is another object of the present invention to provide a vortex type cold and hot gas separating device which has a large air quantity and a low flow speed, and of which an aperture for outputting gas stream can be manufactured to be big.

It is a further object of the present invention to cause the above vortex type cold and hot gas separating device to have a simple structure, low noise and/or a high energy efficiency ratio.

In accordance with a first aspect of the present invention, there is provided a vortex type cold and hot gas separating device, comprising: a body having a cylindrical inner wall surface, the cylindrical inner wall surface defining a cylindrical inner chamber, the cylindrical inner chamber having a first end and a second end opposite to the first end in an axial direction of the cylindrical inner chamber; an intake and agitation fan device attached to the body at the first end of the cylindrical inner chamber, wherein the intake and agitation fan device is disposed to suck external gas into the cylindrical inner chamber and agitate the external gas to form a first vortex rotating along the cylindrical inner wall surface and traveling towards the second end of the cylindrical inner chamber; a hot gas stream discharge port disposed to be located at or adjacent to an edge of the second end of the cylindrical inner chamber so that a part of gas of the first vortex traveling to the hot gas stream discharge port is discharged out of the cylindrical inner chamber through the hot gas stream discharge port; a vortex return device disposed to be located at the second end of the cylindrical inner chamber to return the remaining gas of the first vortex which is not discharged from the hot gas stream discharge port, thereby forming a second vortex traveling towards the first end of the cylindrical inner chamber through a cyclone core of the first vortex; and a cold gas stream discharge port disposed to be located at a radial center of the first end of the cylindrical inner chamber or disposed to be located adjacent to and around the radial center, wherein a temperature of the gas discharged from the hot gas stream discharge port is higher than a temperature of the gas discharged from the cold gas stream discharge port.

Preferably, the intake and agitation fan device comprises a plurality of intake and agitation blades, each intake and agitation blade itself includes an intake part and an agitation part which are integrally formed, and the intake part is disposed to be adapted to suck external gas into the cylindrical inner chamber, so that the gas sucked into the cylindrical inner chamber is agitated by the agitation part to form the first vortex.

Preferably, the intake and agitation fan device comprises: an annular member; a center hub sleeve located at a radial inside of the annular member; and a plurality of rib plates connecting the annular member and the center hub sleeve, wherein the annular member and the center hub sleeve have the same central axis as the cylindrical inner chamber, a space between the center hub sleeve and an annular inner wall of the annular member constitutes the cold gas stream discharge port located adjacent to and around the radial center of the first end of the cylindrical inner chamber, and the plurality of intake and agitation blades are all disposed on an outer circumferential wall of the annular member.

Preferably, each of the rib plates is disposed in the form of a discharge blade to form a negative pressure at the cold gas stream discharge port, thereby facilitating discharge of the gas in the second vortex from the cold gas stream discharge port.

Preferably, the intake and agitation fan device further comprises: a prime mover disposed outside the cylindrical inner chamber; and a fan main shaft having one end connected to the center hub sleeve and the other end connected to an output shaft of the prime mover, so that the prime mover drives the center hub sleeve to rotate through the fan main shaft, and drives the rib plates, the annular member and the intake and agitation blades to rotate.

Preferably, the prime mover is disposed outside the vortex return device along a central axis of the cylindrical inner chamber, and the vortex return device has a through hole at a center of the vortex return device, and the output shaft of the prime mover or the fan main shaft passes through the through hole.

Preferably, the intake and agitation fan device comprises an intake fan and an agitation fan which are separate from each other, wherein the intake fan comprises a plurality of intake blades which are disposed to be adapted to suck external gas into the cylindrical inner chamber, and the agitation fan comprises a plurality of agitation blades which are disposed to be adapted to agitate the gas sucked into the cylindrical inner chamber to form the first vortex.

Preferably, the intake and agitation fan device comprises an intake fan driving wheel and an agitation fan driving wheel which are separate from each other, wherein the intake fan driving wheel is connected to the intake fan to drive the intake blades of the intake fan to rotate, the agitation fan driving wheel is connected to the agitation fan to drive the agitation blades of the agitation fan to rotate, and the intake fan driving wheel and the agitation fan driving wheel are coupled to respective prime movers disposed outside the body of the vortex type cold and hot gas separating device through respective driving belts or chains, respectively.

Preferably, the intake fan driving wheel and the agitation fan driving wheel are disposed on a central tubular mount through respective rolling bearings, respectively; the central tubular mount is fixed to the body of the vortex type cold and hot gas separating device through a web support; and an annular inner wall surface of the central tubular mount defines a central passage which constitutes the cold gas stream discharge port located at the radial center of the first end of the cylindrical inner chamber.

Preferably, the intake and agitation fan device is disposed such that a linear velocity of an outer edge of the agitation part or the agitation blade of the intake and agitation fan device is in a range more than or equal to Mach 1/8 but less than Mach 9/10.

Preferably, the intake and agitation fan device further comprises an isolation shield for isolating sucked gas from discharged gas, the isolation shield includes a flow guiding passage, and an end of the flow guiding passage is disposed to be adjacent to or adjoin the cold gas stream discharge port to receive cold gas stream discharged from the cold gas stream discharge port and guide the received cold gas stream away from the vortex type cold and hot gas separating device.

In accordance with a second aspect of the present invention, there is provided a vortex type cold and hot gas separating device, comprising: a body having a cylindrical inner wall surface, the cylindrical inner wall surface defining a cylindrical inner chamber, the cylindrical inner chamber having a first end and a second end opposite to the first end in an axial direction of the cylindrical inner chamber; a fan disposed outside the body; an gas inlet disposed in the body and adjacent to the first end of the cylindrical inner chamber, a wind guiding tube of the fan is connected to the gas inlet, and the gas inlet is disposed to jet gas stream outputted by the fan into the cylindrical inner chamber substantially in a tangent direction of a circumference of the cylindrical inner chamber to form a first vortex rotating along the cylindrical inner wall surface and traveling towards the second end of the cylindrical inner chamber; a hot gas stream discharge port disposed to be located at or adjacent to an edge of the second end of the cylindrical inner chamber so that a part of gas of the first vortex traveling to the hot gas stream discharge port is discharged out of the cylindrical inner chamber through the hot gas stream discharge port; a vortex return device disposed to be located at the second end of the cylindrical inner chamber to return the remaining gas of the first vortex which is not discharged from the hot gas stream discharge port, thereby forming a second vortex traveling towards the first end of the cylindrical inner chamber through a cyclone core of the first vortex; and a cold gas stream discharge central tubular mount with a cold gas stream discharge passage which is disposed at the first end of the cylindrical inner chamber and extends axially into the cylindrical inner chamber along a central axis of the cylindrical inner chamber, wherein the cold gas stream discharge passage receives the second vortex to isolate the second vortex from the first vortex, and discharges gas of the second vortex out of the vortex type cold and hot gas separating device, and a temperature of the gas discharged from the hot gas stream discharge port is higher than a temperature of the gas discharged from the cold gas stream discharge passage.

Preferably, the vortex type cold and hot gas separating device according to the second aspect of the present invention further comprises a tubular-mount fixation flange with a central through hole, wherein the cold gas stream discharge central tubular mount passes through the central through hole of the tubular-mount fixation flange and is fixed to the body of the vortex type cold and hot gas separating device through the tubular-mount fixation flange.

Preferably, the vortex type cold and hot gas separating device according to the second aspect of the present invention further comprises a cyclone sleeve, wherein the cyclone sleeve is disposed around the cold gas stream discharge central tubular mount in the cylindrical inner chamber and has a truncated cone-shaped part, tapering towards the second end of the cylindrical inner chamber, to guide rotation of the first vortex, thereby reducing a turbulent flow loss of the first vortex.

Preferably, a cylindrical part extends at a position of the truncated cone-shaped part of the cyclone sleeve where the truncated cone-shaped part has a maximal diameter, a distance between a boundary circumference between the cylindrical part and the truncated cone-shaped part and the first end of the cylindrical inner chamber in the axial direction of the cylindrical inner chamber is larger than or equal to a maximal distance between a perimeter of the gas inlet and the first end of the cylindrical inner chamber, and a radius of the boundary circumference is set such that an elongation line of the gas inlet at a lowermost point is substantially tangent to the boundary circumference.

Preferably, an end of the cylindrical part of the cyclone sleeve is fitted over and fixed to an annular step, which protrudes towards an inside of the cylindrical inner chamber, of the tubular-mount fixation flange, and a center hole of the annular step constitutes a part of the central through hole of the tubular-mount fixation flange.

Preferably, a thermal insulation material is disposed between the cyclone sleeve and the cold gas stream discharge central tubular mount to thermally insulate the second vortex in the central through hole of the cold gas stream discharge central tubular mount from the first vortex on a radial outside of the cyclone sleeve.

Preferably, the vortex type cold and hot gas separating device according to the second aspect of the present invention further comprises an axial rectification device, wherein the axial rectification device is fixed to an end portion, which extends into the cylindrical inner chamber, of the cold gas stream discharge central tubular mount to rectify the first vortex passing through the axial rectification device, so that a turbulent flow loss of the first vortex is decreased and flow rates of the swirling gas of the first vortex at points in a circumferential direction are more uniform after rectifying than before rectifying.

Preferably, the axial rectification device is configured to be a dish-shaped spiral member, the dish-shaped spiral member has a central annular member, and a plurality of sector-shaped flow guiding plates extending radially outwards perpendicular to an outer circumferential surface of the central annular member and distributed uniformly in a circumferential direction are fixed on the outer circumferential surface of the central annular member, wherein the plurality of sector-shaped flow guiding plates are disposed such that a wedge-shaped gap is formed between adjacent two of the sector-shaped flow guiding plates to allow gas stream to pass therethrough.

Preferably, the sector-shaped flow guiding plates each have the same size and shape; each of the sector-shaped flow guiding plates has an angle of sector of 40-80°; an overlap of adjacent two of the sector-shaped flow guiding plates on an axial projection has an area of ⅓-⅔ of an area of each sector-shaped flow guiding plate; and a wedge angle of a pointed portion of each wedge-shaped gap and a spacing of a narrowest portion of each wedge-shaped gap are set so that they facilitate reduction of a turbulent flow loss of the first vortex and flow rates of the swirling gas of the first vortex at points in a circumferential direction are more uniform after rectifying than before rectifying.

Preferably, each of the sector-shaped flow guiding plates is a flat-plate type flow guiding plate or a flow guiding plate having a curve-shaped cross-section.

Preferably, the fan is a high-speed fan, and a velocity of gas stream stably outputted by the high-speed fan is in a range more than or equal to Mach 1/8 but less than Mach 9/10.

In accordance with a third aspect of the present invention, there is provided a vortex type cold and hot gas separating device, comprising: a body having a cylindrical inner wall surface, the cylindrical inner wall surface defining a cylindrical inner chamber, the cylindrical inner chamber having a first end and a second end opposite to the first end in an axial direction of the cylindrical inner chamber; a fan disposed outside the body; an end intake and rectification cover with a gas inlet which is fixed to the body at the first end of the cylindrical inner chamber, a wind guiding tube of the fan is connected to the gas inlet to jet gas stream outputted by the fan into the end intake and rectification cover, and the end intake and rectification cover is disposed to form the gas stream outputted by the fan into an initial rotary gas stream and rectify the initial rotary gas stream into a first vortex rotating along the cylindrical inner wall surface and traveling towards the second end of the cylindrical inner chamber; a hot gas stream discharge port disposed to be located at or adjacent to an edge of the second end of the cylindrical inner chamber so that a part of gas of the first vortex traveling to the hot gas stream discharge port is discharged out of the cylindrical inner chamber through the hot gas stream discharge port; a vortex return device disposed to be located at the second end of the cylindrical inner chamber to return the remaining gas of the first vortex which is not discharged from the hot gas stream discharge port, thereby forming a second vortex traveling towards the first end of the cylindrical inner chamber through a cyclone core of the first vortex; and a cold gas stream discharge central tubular mount with a cold gas stream discharge passage which is disposed at the first end of the cylindrical inner chamber, extends axially inwards into the cylindrical inner chamber along a central axis of the cylindrical inner chamber, and extends axially outwards outside the end intake and rectification cover along the central axis of the cylindrical inner chamber, wherein the cold gas stream discharge passage receives the second vortex to isolate the second vortex from the first vortex, and discharges gas of the second vortex out of the vortex type cold and hot gas separating device, and a temperature of the gas discharged from the hot gas stream discharge port is higher than a temperature of the gas discharged from the cold gas stream discharge passage.

Preferably, the end intake and rectification cover comprises an annular housing wall defining a cavity therein, wherein the cavity has a larger diameter than the cylindrical inner chamber of the body of the vortex type cold and hot gas separating device, and the same central axis as the cylindrical inner chamber, and is in direct communication with the cylindrical inner chamber, the gas inlet is disposed in the annular housing wall, and the gas inlet is disposed to jet gas stream outputted by the fan into the cavity of the end intake and rectification cover substantially in a tangent direction of a circumference of the cavity of the end intake and rectification cover to form the initial rotary gas stream; and a radial rectification device disposed in the cavity of the end intake and rectification cover and having the same central axis as the cavity of the end intake and rectification cover, and the radial rectification device is disposed to receive the initial rotary gas stream and rectify the initial rotary gas stream into the first vortex.

Preferably, the end intake and rectification cover further comprises a tubular-mount fixation flange with a central through hole, wherein the cold gas stream discharge central tubular mount passes through the central through hole of the tubular-mount fixation flange and is fixed to an outside end of the annular housing wall of the end intake and rectification cover through the tubular-mount fixation flange, and the radial rectification device is fixed on an inside surface of the tubular-mount fixation flange.

Preferably, the end intake and rectification cover further comprises an end intake and rectification cover fixation flange, wherein an inside end of the annular housing wall of the end intake and rectification cover is fixed to an outer edge part of the end intake and rectification cover fixation flange, and an annular step of the end intake and rectification cover fixation flange is fixed to the outer circumferential wall of the body at the first end of the cylindrical inner chamber.

Preferably, the radial rectification device has a base plate, wherein a plurality of curve-shaped flow guiding plates perpendicular to a side surface of the base plate and distributed uniformly in a circumferential direction are fixed on the side surface of the base plate, and the curve-shaped flow guiding plates are disposed to rectify the initial rotary gas stream into the first vortex having a reduced rotational diameter, and such that the first vortex has not only a higher velocity but also a less turbulent flow loss than the initial rotary gas stream, and such that flow rates of the swirling gas of the first vortex at points in a circumferential direction are more uniform than those of the initial rotary gas stream.

Preferably, a tapered wedge-shaped gap is formed between adjacent two of the curve-shaped flow guiding plates of the radial rectification device to allow gas stream to pass therethrough, and a narrowest pointed portion of the wedge-shaped gap is disposed to be able to jet the rectified gas substantially in a tangent direction of a circumference of the cylindrical inner chamber to form the first vortex.

Preferably, the curve-shaped flow guiding plates of the radial rectification device are each disposed to have the same axial width as each other in an axial direction perpendicular to the base plate, and the axial width is substantially equal to an axial length of the cavity of the end intake and rectification cover.

Preferably, a bisectional plane bisecting the plurality of curve-shaped flow guiding plates of the radial rectification device in a direction of the axial width and a central axis of the gas inlet lie in the same plane; and/or an elongation line of the gas inlet at a lowermost point is substantially tangent to an outer enveloping circumference of outer edges of the plurality of curve-shaped flow guiding plates; and/or an inner enveloping circumference of inner edges of the plurality of curve-shaped flow guiding plates is concentric with the cylindrical inner chamber, and has a diameter equal to or smaller than that of the cylindrical inner chamber.

Preferably, a cross-sectional shape, in a flow guiding direction, of each of the curve-shaped flow guiding plates of the radial rectification device is formed by enclosure of an inside curve, an outside curve, and an end connection and transition line, wherein the inside curve is formed by smoothly connecting a segment of elliptic curve, a segment of Witosznski curve, and a segment of straight line located at a gas stream outlet, and the outside curve is formed by smoothly connecting a segment of circular arc curve and a segment of straight line located near the gas stream outlet.

Preferably, the vortex type cold and hot gas separating device according to the third aspect of the present invention further comprises a tubular-mount fixation flange with a central through hole, wherein the cold gas stream discharge central tubular mount passes through the central through hole of the tubular-mount fixation flange and is fixed to an outside end of the annular housing wall of the end intake and rectification cover through the tubular-mount fixation flange, the radial rectification device is fixed in an annular recess on an inside surface of the tubular-mount fixation flange through the base plate, and the annular recess has a recess depth substantially equal to a thickness of the base plate.

Preferably, the fan is a high-speed fan, and a velocity of gas stream stably outputted by the high-speed fan is in a range more than or equal to Mach 1/8 but less than Mach 9/10.

In accordance with a fourth aspect of the present invention, there is provided a vortex type cold and hot gas separating device, comprising: a body, a hot gas stream discharge port, a vortex return device, and a cold gas stream discharge port, wherein the vortex return device is disposed to have a gas stream focusing and reflecting surface with a shape of a concave curve, and the hot gas stream discharge port is disposed on a radial outside of the gas stream focusing and reflecting surface in the vortex return device such that when the undischarged remaining gas of a first vortex past the hot gas stream discharge port travels along the gas stream focusing and reflecting surface, a cyclone radius of the remaining gas is gradually reduced, a rotational speed of the remaining gas is gradually increased, a centrifugal force on the remaining gas is enhanced, and the remaining gas is attracted by a negative pressure of a cyclone core of the first vortex, thereby forming a second vortex returning towards a first end of the cylindrical inner chamber through the cyclone core of the first vortex.

Preferably, the gas stream focusing and reflecting surface is a gas stream focusing and reflecting surface having a shape of a concave paraboloid, a gas stream focusing and reflecting surface having a shape of a concave ellipsoid, or a gas stream focusing and reflecting surface having a shape of a concave sphere.

Preferably, a thermal insulation layer is disposed outside the gas stream focusing and reflecting surface to avoid influence of an environment on a temperature of gas stream located at the gas stream focusing and reflecting surface.

Preferably, the vortex type cold and hot gas separating device according to the fourth aspect of the present invention further comprises an intake device for inputting external gas into a cylindrical cavity in the body to form the first vortex.

In the vortex type cold and hot gas separating devices according to the aspects of the present invention, preferably, the vortex return device is disposed to have a gas stream focusing and reflecting surface with a shape of a concave curve, and the hot gas stream discharge port is disposed on a radial outside of the gas stream focusing and reflecting surface in the vortex return device such that when the undischarged remaining gas of the first vortex past the hot gas stream discharge port travels along the gas stream focusing and reflecting surface, a cyclone radius of the remaining gas is gradually reduced, a rotational speed of the remaining gas is gradually increased, a centrifugal force on the remaining gas is enhanced, and the remaining gas is attracted by a negative pressure of a cyclone core of the first vortex, thereby forming the second vortex returning towards the first end of the cylindrical inner chamber through the cyclone core of the first vortex.

In the vortex type cold and hot gas separating devices according to the aspects of the present invention, preferably, the gas stream focusing and reflecting surface is a gas stream focusing and reflecting surface having a shape of a concave paraboloid, a gas stream focusing and reflecting surface having a shape of a concave ellipsoid, or a gas stream focusing and reflecting surface having a shape of a concave sphere.

In the vortex type cold and hot gas separating devices according to the aspects of the present invention, preferably, a thermal insulation layer is disposed outside the gas stream focusing and reflecting surface to avoid influence of an environment on a temperature of gas stream located at the gas stream focusing and reflecting surface.

In the vortex type cold and hot gas separating devices according to the aspects of the present invention, preferably, the vortex return device is detachably mounted to the body of the vortex type cold and hot gas separating device at the second end of the cylindrical inner chamber, the hot gas stream discharge port is composed of one round of annular groove disposed on a side surface of the vortex return device facing the cylindrical inner chamber; and a radially outer wall of the annular groove has at least one opening leading to an outside.

In the vortex type cold and hot gas separating devices according to the aspects of the present invention, preferably, an inner valve ring for controlling a discharge amount of hot gas stream is disposed in the annular groove, an outer periphery of the inner valve ring has a truncated cone-shaped surface tapering towards the cylindrical inner chamber, the truncated cone-shaped surface of the inner valve ring and a corresponding truncated cone-shaped surface located on an edge of an end surface of the body and protruding into the annular groove define an opening degree of the hot gas stream discharge port together, so that the discharge amount of hot gas stream can be adjusted by adjusting an axial position where the inner valve ring is located in the annular groove.

In the vortex type cold and hot gas separating devices according to the aspects of the present invention, preferably, the vortex return device is fixed to the body of the vortex type cold and hot gas separating device at the second end of the cylindrical inner chamber, or the vortex return device is an integral part of the body of the vortex type cold and hot gas separating device which continuously extends at the second end of the cylindrical inner chamber.

In the vortex type cold and hot gas separating devices according to the aspects of the present invention, preferably, the hot gas stream discharge port is composed of at least one opening in the vortex return device.

In the vortex type cold and hot gas separating devices according to the aspects of the present invention, preferably, the vortex type cold and hot gas separating device further comprises a valve plate device for adjusting a discharge amount of hot gas stream, and the valve plate device comprises a handwheel, a rod body, a threaded hole mount fixed to an outside of the vortex return device, and a valve claw member with at least one valve claw, wherein a segment of the rod body close to an end thereof is formed into a screw segment, a portion of the screw segment is operatively screwed into and fixed to the threaded hole mount, and the other end of the rod body is fixed to the handwheel; an end of the valve claw member is connected to the handwheel or the rod body such that the valve claw member can move axially along with the handwheel and the rod body, but does not rotate along with the handwheel and the rod body; and a valve plate is disposed at an end of each valve claw, a spacing between the valve plate and the at least one opening in the vortex return device defines the opening degree of the hot gas stream discharge port, so that the discharge amount of hot gas stream can be adjusted by the valve plate device.

In the vortex type cold and hot gas separating devices according to the aspects of the present invention, preferably, a heat dissipation or cooling device is disposed outside the body of the vortex type cold and hot gas separating device to cool a wall of the body, such that the hot gas stream rotating along the cylindrical inner wall surface of the body is cooled by heat conduction of the wall of the body; or a thermal insulation device is disposed outside the body of the vortex type cold and hot gas separating device to reduce dissipation of heat from the wall of the body to the environment and thus dissipation of heat from the hot gas stream rotating along the cylindrical inner wall surface of the body to the environment; or a multipurpose device for thermal insulation and cooling is disposed outside the body of the vortex type cold and hot gas separating device, the multipurpose device can be operatively set to cool the wall of the body, such that the hot gas stream rotating along the cylindrical inner wall surface of the body is cooled by heat conduction of the wall of the body, or to reduce dissipation of heat from the wall of the body to the environment and thus dissipation of heat from the hot gas stream rotating along the cylindrical inner wall surface of the body to the environment.

The above and other objects, advantages, and features of the present invention will become apparent and more readily appreciated from the following detailed description of the preferable embodiments of the present invention, taken in conjunction with the accompanying drawing.

BRIEF DESCRIPTION OF THE DRAWINGS

The preferable embodiments of the present invention will be described in detail in conjunction with the accompanying drawings in a non-limiting exemplary manner. In the accompanying drawings, like reference numerals refer to the like elements throughout. The drawings are not necessarily drawn to scale. In the accompanying drawings.

DETAILED DESCRIPTION OF THE EMBODIMENTS

Figure 6:
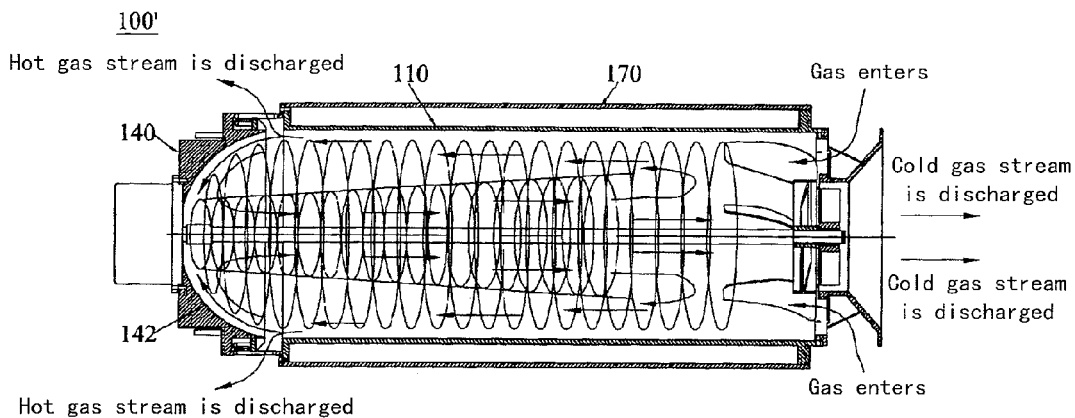
FIG. 6 is a schematic section view of a vortex type cold and hot gas separating device according to a modification of the first embodiment of the present invention, in which a flow process of gas in the vortex type cold and hot gas separating device is shown and a gas stream focusing and reflecting surface of the vortex type cold and hot gas separating device has a shape of a concave sphere.
Figure 7:
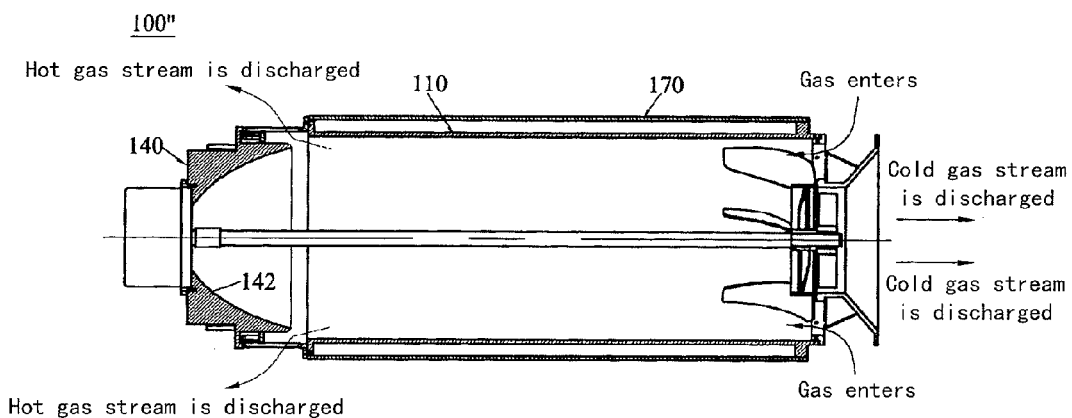
FIG. 7 is a schematic section view of a vortex type cold and hot gas separating device according to another modification of the first embodiment of the present invention, in which the gas stream focusing and reflecting surface of the vortex type cold and hot gas separating device has a shape of a concave ellipsoid.

Referring to FIGS. 2-5, FIGS. 2-5 show a schematic side view, a schematic section view, and schematic exploded perspective views, viewed from two different viewing angles, of a vortex type cold and hot gas separating device 100 according to a first embodiment of the present invention, respectively. FIGS. 6 and 7 are schematic section views of vortex type cold and hot gas separating devices 100' and 100" according to a modification of the first embodiment of the present invention, in which gas stream focusing and reflecting surfaces with different shapes are used.

As shown in FIGS. 2-7, when considered from operation mechanism, the vortex type cold and hot gas separating device 100 according to the first embodiment of the present invention comprises: a body 110, an intake and agitation fan device 120, a hot gas stream discharge port 130, a vortex return device 140, and a cold gas stream discharge port 150.

The body 110 has a cylindrical inner wall surface 111 defining a cylindrical inner chamber 112. The cylindrical inner chamber 112 has a first end 113 and a second end 114 opposite to the first end in an axial direction of the cylindrical inner chamber.

The intake and agitation fan device 120 is attached to the body 110 at the first end 113 of the cylindrical inner chamber 112, and is disposed to suck external gas into the cylindrical inner chamber 112 and agitate the external gas to form a first vortex rotating along the cylindrical inner wall surface 111 and traveling towards the second end 114 of the cylindrical inner chamber 112.

The hot gas stream discharge port 130 is disposed adjacent to an edge 115 of the second end 114 of the cylindrical inner chamber 112 so that a part of gas of the first vortex traveling to the hot gas stream discharge port 130 is discharged out of the cylindrical inner chamber 112 through the hot gas stream discharge port 130. A vicinity of the hot gas stream discharge port 130 is preferably disposed such that hot gas stream is smoothly discharged to reduce a turbulent flow loss.

The vortex return device 140 is disposed to be located at the second end 114 of the cylindrical inner chamber 112 to reflect the remaining gas of the first vortex which is not discharged from the hot gas stream discharge port 130, thereby forming a second vortex returning towards the first end 113 of the cylindrical inner chamber 112 through a cyclone core of the first vortex.

The cold gas stream discharge port 150 is disposed to be located adjacent to and around a radial center of the first end 113 of the cylindrical inner chamber 112. Preferably, the vortex type cold and hot gas separating device 100 further comprises an adjusting device disposed at or near the hot gas stream discharge port 130 for adjusting a discharge amount of hot gas stream. A temperature of discharged cold gas stream can be adjusted in a range by adjusting the discharge amount of hot gas stream.

In the first embodiment of the present invention, the intake and agitation fan device 120 preferably comprises a plurality of intake and agitation blades 121. Each intake and agitation blade 121 itself includes an intake part 122 and an agitation part 123 which are integrally formed, and the intake part 122 is disposed to be adapted to suck external gas into the cylindrical inner chamber 112, so that the gas sucked into the cylindrical inner chamber 112 is agitated by the agitation part 123 to form the first vortex. The intake and agitation blade 121 is preferably made of a high-strength, heat-resistant, rust-resisting and light-alloy material, such as high-strength aluminium alloy or titanium steel. In order to further achieve an effect of generation of strong swirling gas stream, the intake and agitation blade 121 may be made longer, and the cylindrical inner wall surface 111 of the vortex type cold and hot gas separating device 100 may be made to slightly have a very small taper, for example which is smaller than 1° or 0.5° or less. The intake and agitation blade 121 matches with the cylindrical inner wall surface 111 slightly having a taper to function to increase a velocity and a density of the swirling gas stream. When a specific shape of the intake and agitation blade 121 is designed, it is not necessary that gas sucking and discharging flow rates are too large.

Specifically, the intake and agitation fan device 120 further preferably comprises: an annular member 124; a center hub sleeve 125 located at a radial inside of the annular member 124; and a plurality of rib plates 126 connecting the annular member 124 and the center hub sleeve 125. The annular member 124 and the center hub sleeve 125 preferably have the same central axis as the cylindrical inner chamber 112. A space between the center hub sleeve 125 and an annular inner wall of the annular member 124 constitutes the cold gas stream discharge port 150 of the vortex type cold and hot gas separating device 100. In addition, the plurality of intake and agitation blades 121 are all disposed on an outer circumferential wall of the annular member 124.

More preferably, each of the rib plates 126 is disposed in the form of a discharge blade to form a negative pressure at the cold gas stream discharge port 150, thereby facilitating discharge of the gas in the second vortex from the cold gas stream discharge port 150. The negative pressure formed by the discharge blades at the cold gas stream discharge port 150 should not be too large so long as it can facilitate discharge of the gas in the second vortex from the cold gas stream discharge port 150, and it should not affect the first vortex in the cylindrical inner chamber 112.

As can be realized by those skilled in the art, the intake and agitation fan device 120 further may comprise a prime mover 128, preferably an electric motor, more preferably a high-speed electric motor of which an output speed can reach 10000 rpm or more, and preferably a rotational speed is adjustable to control a temperature and a flow rate of discharged cold wind. In the first embodiment of the present invention, the prime mover 128 is disposed outside the cylindrical inner chamber 112, and an output shaft of the prime mover drives the center hub sleeve 125 to rotate through a fan main shaft 127 of the intake and agitation fan device 120, and thus drives the rib plates 126, the annular member 124 and the intake and agitation blades 121 to rotate. Specifically, the prime mover 128 may be disposed outside the vortex return device 140 along a central axis of the cylindrical inner chamber 112. In this case, a through hole 141 should be disposed at a center of the vortex return device 140 so that the output shaft of the prime mover 128 or the fan main shaft 127 passes through the through hole 141 to be connected to the center hub sleeve 125. Those skilled in the art should realize that the transmission from the prime mover 128 to the center hub sleeve 125 and further to the intake and agitation blade 121 also may have other forms instead. For example, in a more complicated case, a speed change mechanism such as a gear speed change mechanism or a belt pulley speed change structure also may be disposed between the output shaft of the prime mover 128 and the fan main shaft 127.

Selection of a rotational speed of the prime mover 128 and a ratio of transmission of an intermediate transmission (if there is an intermediate transmission) will determine an angular velocity at which the intake and agitation blade 121 rotates, while a rotational radius of the intake and agitation blade 121 determines a linear velocity of the blade when the intake and agitation blade is at a particular angular velocity, which is well known in the art. Those skilled in the art could easily specifically select and design the rotational speed of the prime mover, the ratio of transmission of the intermediate transmission, and the rotational radius of the intake and agitation blade 121 according to requirements of specific application. In some embodiments of the present invention, in particular, the selection and design should be such that a linear velocity of an outer edge of the agitation part or the agitation blade of the intake and agitation fan device is more than or equal to Mach 1/8, for example specifically may be Mach 1/7, Mach 1/6, Mach 1/5, Mach 1/4, Mach 1/3, Mach 1/2, 1/2, Mach 2/3, Mach 3/4, Mach 4/5, Mach 5/6, Mach 6/7, Mach 7/8, even may approach Mach 9/10 (the so-called sonic barrier critical value well known by those skilled in the art), and may be any specific numerical value or any interval between the above-mentioned any two numerical values. In fact, the linear velocity is substantially equal to a linear velocity of an outer edge of a gas disk of the formed first vortex, and a linear velocity of an outer edge of a gas disk of a vortex in a limited space is generally also called a linear velocity of the vortex for short. Furthermore, for example it can be qualitatively and inaccurately considered that in the device of the present invention, a temperature of the obtained cold gas stream can be decreased by about 60° C. relative to a temperature of the sucked gas stream when the linear velocity of the first vortex approaches Mach 9/10 (the sonic barrier critical value), while the effect of cold and hot gas separation is substantially directly proportional to the square of the linear velocity of the first vortex, and the effect of cold and hot gas separation is also affected by many other factors with decrease of the linear velocity of the first vortex. Therefore, for example it can be expected that cold gas stream of which a temperature is decreased by about 6-7° C. relative to a temperature of the sucked gas stream is obtained when the linear velocity of the first vortex is Mach 1/3. It needs to be emphasized that the above numerical values and qualitative relationship are not known in the art, but are found and creatively designed by the inventor of the present application after having deeply cognized the Ranque-Hilsch effect. Hence, in the preferable embodiments of the present invention, a high-pressure compressed gas is not used as a gas source, and a pressure of gas jetted in is not emphasized either, but a centrifugal force of rotation of the vortex is emphasized, and thus a vortex type cold and hot gas separating device with a brand-new structure is designed with a linear velocity of rotation of the vortex and a temperature, by which the temperature of the cold gas stream can be decreased, serving as a design criterion. In the vortex type cold and hot gas separating device according to the present invention, a diameter of the cylindrical inner chamber 120 can be up to, for example, 100 mm, 200 mm, 300 mm, 400 mm, 500 mm, 1 m, 2 m, or even more, and facilitates satisfying application requirements of a large air quantity, a low wind speed, and a large aperture.

In the first embodiment of the present invention, the intake and agitation fan device 120 further may comprise an isolation shield 160 for isolating sucked gas from discharged gas. The isolation shield 160 includes a flow guiding passage 161, and an end of the flow guiding passage is disposed to be adjacent to or adjoin the cold gas stream discharge port 150 to receive cold gas stream discharged from the cold gas stream discharge port 150 and guide and convey the received cold gas stream to a position at a distance away from an outside of the cylindrical inner chamber 112. In other words, the cold gas stream is finally disposed out of the vortex type cold and hot gas separating device 100 to be treated or utilized, thereby avoiding the discharged cold gas stream from being re-sucked into the vortex type cold and hot gas separating device 100. Therefore, when considered from a cold gas stream discharging function, the flow guiding passage 161 of the isolation shield 160 also may be regarded as a part of the cold gas stream discharge port 150. In addition, those skilled in the art also can realize that an end opening of the isolation shield may be disposed to have a shape of a bell mouth or any other appropriate shape or have an adapter joint, so as to facilitate diffusion or collection and utilization of the cold gas stream. Furthermore, members such as some ribs, rib plates and/or annular rings also may be disposed outside of a cylinder wall of the flow guiding passage of the isolation shield, so that the isolation shield 160 also simultaneously functions as a protective cover of the intake and agitation blades 121 of the intake and agitation fan device 120 and/or a guiding cover for sucked gas and/or a guiding cover for discharged cold gas stream, and the like. Dispose of the additional members can be readily understood and implemented by those skilled in the art and thus will be no longer unnecessarily described.

Figure 1:
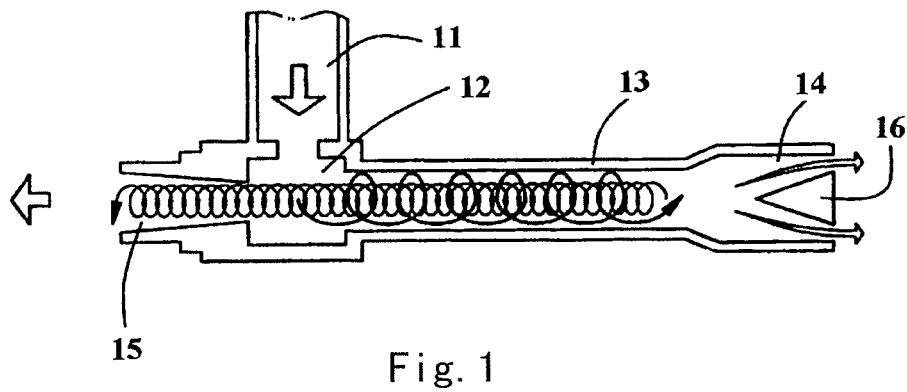
FIG. 1 is a schematic diagram of a vortex tube in the prior art which performs cold and hot gas separation by the Ranque-Hilsch effect.
Figure 2:
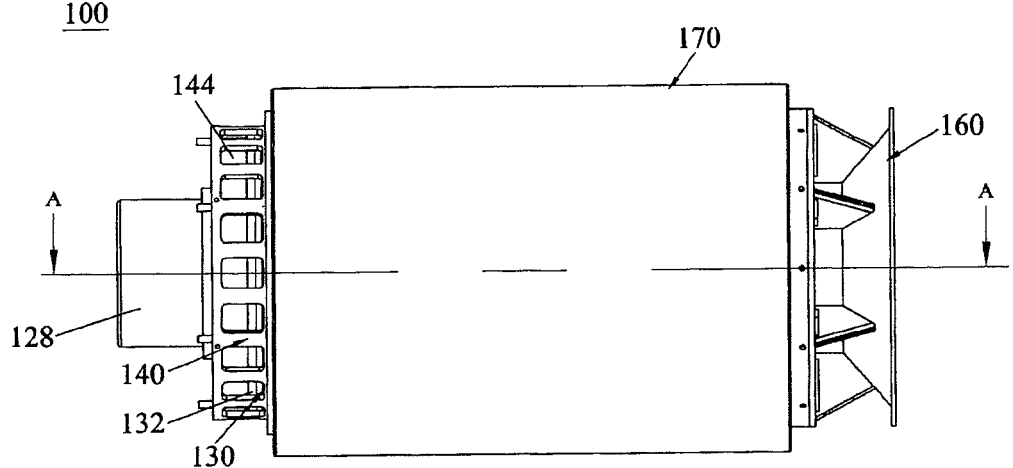
FIG. 2 is a schematic side view of a vortex type cold and hot gas separating device according to a first embodiment of the present invention.
Figure 3:
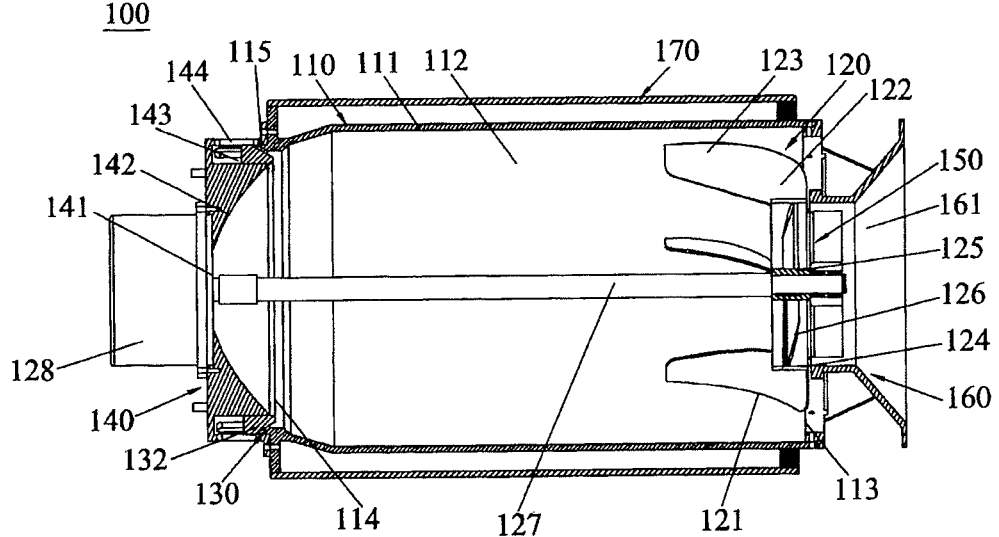
FIG. 3 is a schematic section view of the vortex type cold and hot gas separating device according to the first embodiment of the present invention, which is taken along a cutting line A-A in FIG. 2.

Particularly, in the preferable embodiments of the present invention, the vortex return device 140 is preferably disposed to have a gas stream focusing and reflecting surface 142 with a shape of a concave paraboloid (referring to, for example, FIGS. 8, 12, and 20), a gas stream focusing and reflecting surface 142 with a shape of a concave ellipsoid (referring to, for example, FIG. 7), or a gas stream focusing and reflecting surface 142 with a shape of a concave sphere (referring to, for example, FIGS. 3 and 6). In addition, the hot gas stream discharge port 130 is disposed on a radial outside of the gas stream focusing and reflecting surface 142 in the vortex return device 140 such that when the undischarged remaining gas of the first vortex past the hot gas stream discharge port 130 travels along the gas stream focusing and reflecting surface 142, a cyclone radius of the remaining gas is gradually reduced, a rotational speed of the remaining gas is gradually increased, a centrifugal force on the remaining gas is enhanced, and the remaining gas is attracted by a negative pressure of a cyclone core of the first vortex, thereby forming the second vortex returning towards the first end 113 of the cylindrical inner chamber 112 through the cyclone core of the first vortex. According to the contents disclosed in the present application, those skilled in the art should realize that the vortex return device 140 of the present invention also can employ a gas stream focusing and reflecting surface with a shape of any other concave curve which can reflect the vortex to gather the vortex to a core of the cylindrical inner chamber 112 of the vortex type cold and hot gas separating device 100, i.e. a portion in the cyclone core of the first vortex around the central axis of the cylindrical inner chamber 112. For example, a diameter of the cyclone core of the first vortex generally does not exceed ¾, ⅔, ½, ⅓, ¼, or the like of an inner diameter of the cylindrical inner chamber 112.

Figure 4:
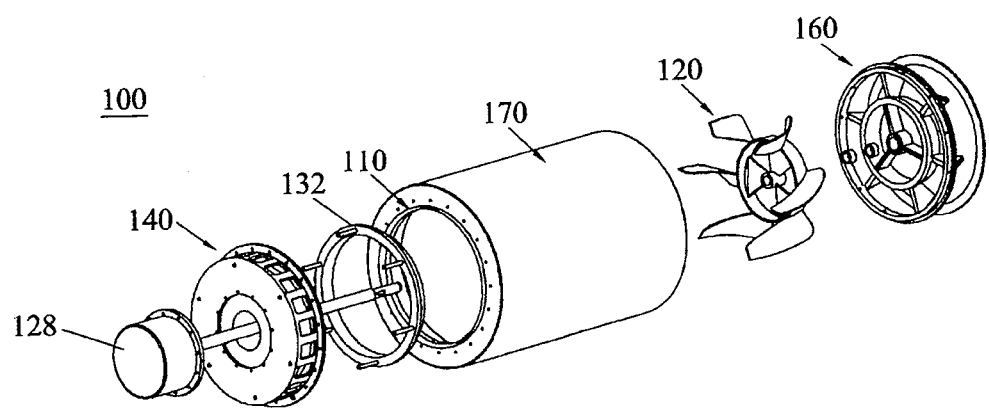
FIGS. 4 and 5 are schematic exploded perspective views of the vortex type cold and hot gas separating device of FIG. 2 viewed from different viewing angles, respectively.
Figure 5:
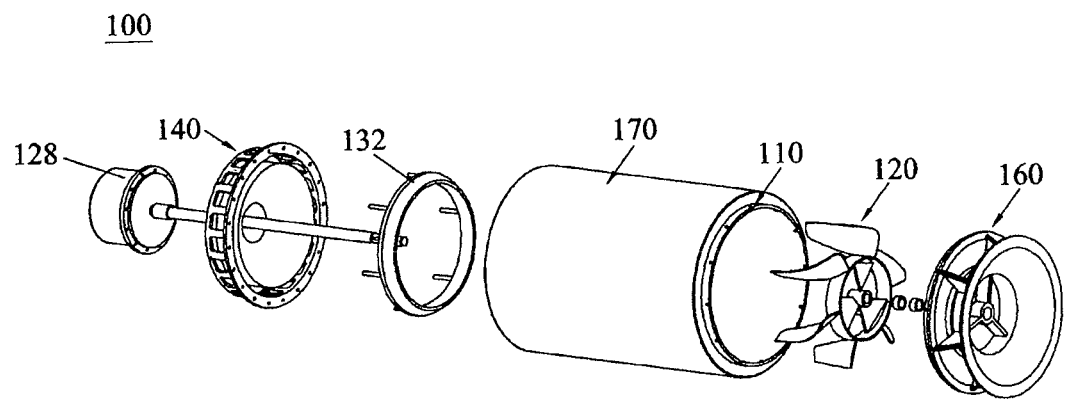

Preferably, in the preferable embodiments of the present invention, for example referring to the first embodiment shown in FIG. 3, the vortex return device 140 is detachably mounted to the body 110 of the vortex type cold and hot gas separating device at the second end 114 of the cylindrical inner chamber 112. The hot gas stream discharge port 130 is preferably composed of one round of annular groove 143 disposed on that side surface of the vortex return device 140 facing the cylindrical inner chamber 112. A radially outer wall of the annular groove 143 has at least one opening 144 leading to an outside. An inner valve ring 132 for controlling a discharge amount of hot gas stream is disposed in the annular groove 143. An outer periphery of the inner valve ring 132 has a truncated cone-shaped surface tapering towards the cylindrical inner chamber 112, and the truncated cone-shaped surface and a corresponding truncated cone-shaped surface located on an edge 115 of an end surface of the body 110 and protruding into the annular groove 143 define an opening degree of the hot gas stream discharge port 130 together, so that the discharge amount of hot gas stream can be adjusted by adjusting an axial position where the inner valve ring is located in the annular groove. As shown in FIG. 4, for example, preferably rods distributed uniformly in a circumferential direction may extend from a ring body of the inner valve ring 132. The rods may extend through the through holes in a housing of the reflection return device 140 to facilitate adjustment of the axial position of the inner valve ring 132 in various manners. The specific technique itself for adjusting the axial position of the inner valve ring 132 is well known in the art and can be easily achieved by those skilled in the art, for example in a screw manner, a driving fit manner or the like, and thus will be no longer unnecessarily described.

Preferably, in the preferable embodiments of the present invention, a heat dissipation or cooling device 170 (for example, a sandwich water tank which can be cooled by water) is disposed outside the body 110 of the vortex type cold and hot gas separating device to cool a wall of the body, such that the hot gas stream rotating along the cylindrical inner wall surface 111 of the body 110 is cooled by heat conduction of the wall of the body; or instead a thermal insulation device 170 (for example, which may be a vacuumized vacuum sandwich wall) is disposed outside the body 110 of the vortex type cold and hot gas separating device to reduce dissipation of heat from the wall of the body to the environment and thus dissipation of heat from the hot gas stream rotating along the cylindrical inner wall surface 111 of the body 110 to the environment; or instead a device 170 (for example, which may be a sandwich wall both adapted to be vacuumized, and adapted to be injected with cooling water or other cooling medium, and a user can select its specific function according to requirements) with thermal insulation and cooling multi-purpose functions is disposed outside the body 110 of the vortex type cold and hot gas separating device, and the device can be operatively set to cool the wall of the body, such that the hot gas stream rotating along the cylindrical inner wall surface 111 of the body 110 is cooled by heat conduction of the wall of the body, or to reduce dissipation of heat from the wall of the body to the environment and thus dissipation of heat from the hot gas stream rotating along the cylindrical inner wall surface 111 of the body 110 to the environment.

FIGS. 8-11 show schematic views of a vortex type cold and hot gas separating device 200 according to a second embodiment of the present invention.

As shown in FIGS. 8-11, the vortex type cold and hot gas separating device 200 according to the second embodiment of the present invention also comprises a body 110, an intake and agitation fan device 120, a hot gas stream discharge port 130, a vortex return device 140, and a cold gas stream discharge port 150.

Figure 8:
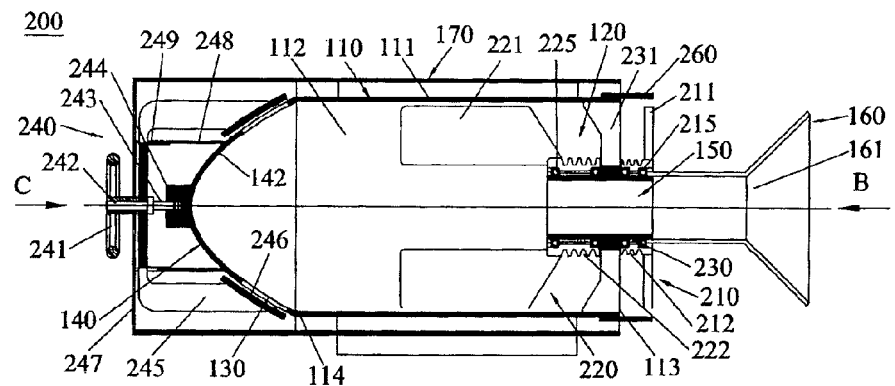
FIG. 8 is a schematic section view of a vortex type cold and hot gas separating device according to a second embodiment of the present invention.
Figure 9:
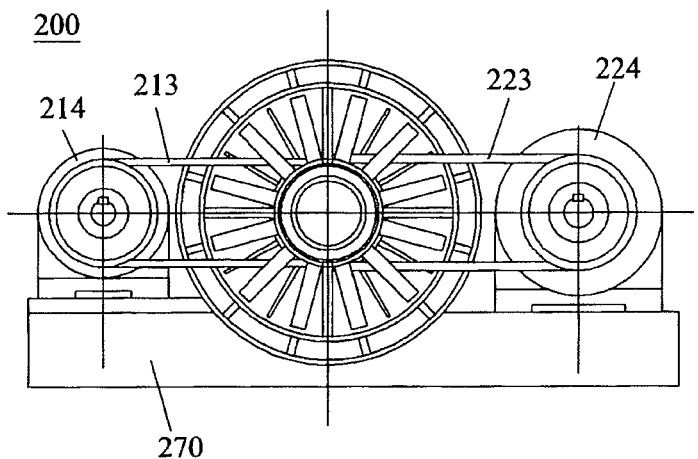
FIG. 9 is a schematic end view of the vortex type cold and hot gas separating device viewed in a direction indicated by an arrow B in FIG. 8, which also shows two independent prime movers disposed outside a body of the vortex type cold and hot gas separating device.
Figure 10:
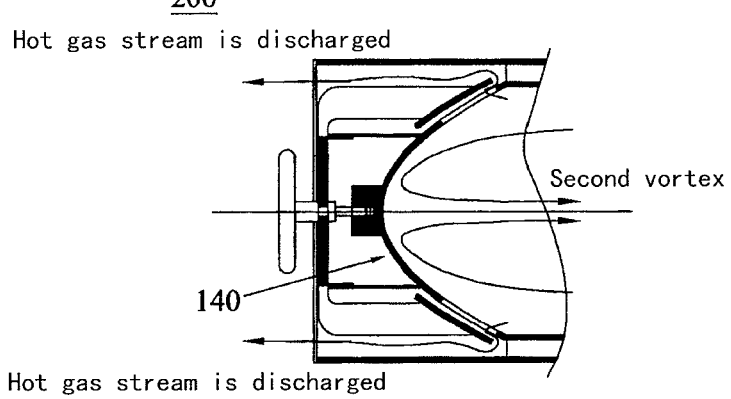
FIG. 10 is a schematic partial section view of the vortex type cold and hot gas separating device of FIG. 8, which shows gas flow paths near a hot gas stream discharge port and a vortex return device of the vortex type cold and hot gas separating device.
Figure 11:
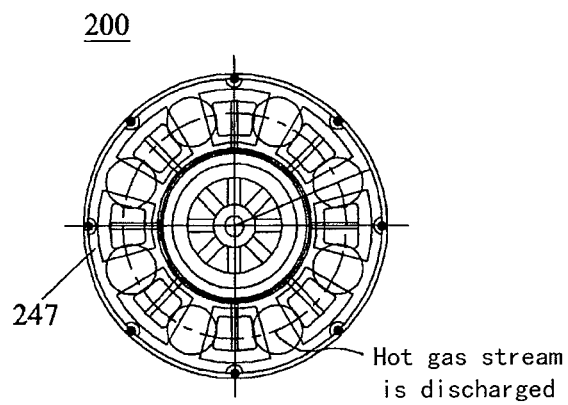
FIG. 11 is a schematic end view of the vortex type cold and hot gas separating device viewed in a direction indicated by an arrow C in FIG. 8.

A main difference between the second embodiment and the first embodiment shown in FIGS. 2-7 is that the intake and agitation fan device 120 comprises an intake fan 210 and an agitation fan 220 which are separate from each other in the vortex type cold and hot gas separating device 200 according to the second embodiment of the present invention. The intake fan 210 comprises a plurality of intake blades 211 which are disposed to be adapted to suck external gas into the cylindrical inner chamber 112. The agitation fan 220 comprises a plurality of agitation blades 221 which are disposed to be adapted to agitate the gas sucked into the cylindrical inner chamber 112 such that the gas is formed into the first vortex. With the same principle discussed in the first embodiment, when specific shapes of the intake blades 211 and the agitation blades 221 are designed, it is not necessary that gas sucking and discharging flow rates of the intake blades 211 are too large, but the agitation blades 221 are caused to have an effect that gas is strongly agitated to be formed into vortex. Therefore, the intake blades 211 are preferably designed to be shorter, but the agitation blades 221 are preferably designed to be longer. The intake blades 211 and the agitation blades 221 may be made of the same material or different materials. For example, the intake blades 211 and the agitation blades 221 are all made of the same high-strength, heat-resistant, rust-resisting, light-alloy material, such as one of high-strength aluminium alloy or titanium steel, or the intake blades 211 and the agitation blades 221 are made of different high-strength, heat-resistant, rust-resisting, light-alloy materials (for example, the intake blades 211 are made of high-strength aluminium alloy, while the agitation blades 221 are made of titanium steel); or the intake blades 211 are made of general-strength material, while the agitation blades 221 are made of high-strength, heat-resistant, rust-resisting, light-alloy material. The intake fan 210 and the agitation fan 220 are preferably driven by an intake fan driving wheel 212 and an agitation fan driving wheel 222 which are separate from each other, respectively. Referring now to FIGS. 8 and 9, it can be seen from FIGS. 8 and 9 that the intake fan driving wheel 212 and the agitation fan driving wheel 222 are coupled to respective prime movers 214 and 224 disposed outside the body 110 of the vortex type cold and hot gas separating device 200 through respective driving belts or chains 213 and 223, respectively. The arrangement enables the intake fan 210 and the agitation fan 220 to be controlled independently and thus has more flexibility in application. FIG. 9 also shows a mounting 270 the vortex type cold and hot gas separating device 200 may comprise. The heat dissipation or cooling device 170 or the body 110 and the prime movers 214 and 224 and the like of the vortex type cold and hot gas separating device 200 are all fixed on the mounting 270.

Specifically, in the second embodiment of the present invention, the intake fan driving wheel 212 and the agitation fan driving wheel 222 are disposed on a central tubular mount 230 through respective rolling bearings 215 and 225, respectively. The central tubular mount 230 is fixed to the body 110 of the vortex type cold and hot gas separating device 200 through a web support 231. An annular inner wall surface of the central tubular mount 230 defines a central passage which constitutes the cold gas stream discharge port 150 located at the radial center of the first end 113 of the cylindrical inner chamber 112.

Another main difference between the second embodiment and the first embodiment shown in FIGS. 2-7 is that in the vortex type cold and hot gas separating device 200 according to the second embodiment of the present invention, the vortex return device 140 is fixed to the body 110 of the vortex type cold and hot gas separating device 200 at the second end 114 of the cylindrical inner chamber 112, or the vortex return device 140 is an integral part of the body 110 of the vortex type cold and hot gas separating device 200 which continuously extends at the second end 114 of the cylindrical inner chamber 112. In this solution, the hot gas stream discharge port 130 is preferably composed of at least one opening in the vortex return device 140 which is adjacent to an edge of the body 110 located at the second end 114 of the cylindrical inner chamber 112. The at least one opening is preferably a plurality of openings, for example 3 or more, 4 or more, 5 or more, 6 or more, 7 or more, 8 or more, 9 or more, or 10 or more openings, distributed uniformly in the circumferential direction. In the example shown in FIGS. 8-11, the number of the openings is 8.

In order to adapt the new form of the hot gas stream discharge port 130, an adjusting device, for adjusting a discharge amount of hot gas stream, in another form is accordingly adopted in the vortex type cold and hot gas separating device 200 according to the second embodiment of the present invention. The adjusting device comprises a valve plate device 240 for adjusting the discharge amount of hot gas stream. The valve plate device 240 may comprise a handwheel 241, a rod body 242, a threaded hole mount 244, and a valve claw member 245.

A thread is formed on a segment of the rod body 242 close to an end thereof to form a screw segment 243. A portion of the screw segment 243 is operatively screwed into the threaded hole mount 244 fixed to an outside of the vortex return device 140. The other end of the rod body 242 is fixed to the handwheel 241, and preferably fixed in a protruding connection part of the handwheel 241.

An end of the valve claw member 245 is connected to the handwheel 241 or the rod body 242. Preferably, the connection manner should be such that the valve claw member 245 can move axially along with the handwheel 241 and the rod body 242, but does not rotate along with the handwheel 241 and the rod body 242. Specifically, for example, a diameter-enlarged step segment may be formed in a region of the rod body 242 close to the screw segment 243, and a portion of the rod body 242 on a side of the step segment opposite to the screw segment is a smooth rod segment. An end of the smooth rod segment is fixed in a fixing hole in the protruding connection part of the handwheel 241. The valve claw member 245 is fitted over the smooth rod segment between the step segment of the rod body 242 and the protruding connection part of the handwheel 241, through a central through hole in the end plate of the valve claw member 245 by means of a clearance fit (apparently, a diameter of the central through hole of the end plate is preferably larger than a diameter of the smooth rod segment, but smaller than a diameter of the step segment and a diameter of the protruding connection part of the handwheel 241), while ensuring that a spacing between the step segment of the rod body 242 and the protruding connection part of the handwheel 241 is substantially equal to or slightly larger than a thickness of the end plate of the valve claw member 245. As a result, the valve claw member 245 can move axially along with the handwheel 241 and the rod body 242, but substantially does not rotate along with the handwheel 241 and the rod body 242 (the influence of frictional force is temporarily omitted).

At least one valve claw extends from the other end of the valve claw member 245. The number of the valve claws is preferably the same as the number of the openings constituting the hot gas stream discharge ports 130. A corresponding valve plate 246 is disposed at an end of each valve claw 245.

A spacing between the valve plate 246 and the opening in the vortex return device defines the opening degree of the hot gas stream discharge port 130. Therefore, a depth by which the screw segment 243 is screwed in the threaded hole mount 244 can be adjusted by rotating the handwheel 241 of the valve plate device to adjust an axial position where the valve plate 246 is located, thereby achieving the purpose of adjusting the opening degree of the hot gas stream discharge port 130 (i.e., achieving the purpose of adjusting the discharge amount of hot gas stream).

Furthermore, the valve plate device 240 may further comprise a rear cover flange 247 with a plurality of through holes. The rear cover flange 247 is located between the handwheel 241 and the valve claw 245. The rear cover flange 247 is fixed directly or indirectly to the body 110. Preferably, the rear cover flange 247 is fixed directly to an extension part of the heat dissipation or cooling device 170 and thus indirectly to the body 110. In order to avoid discharged hot gas stream from improperly heating the vortex return device 140, preferably a discharged hot gas stream isolating shield 248 may also be disposed. The cylindrical discharged hot gas stream isolating shield 248 is disposed outside the vortex return device 140. In particular, a notch groove 249 slidingly fitting with the valve claw is formed on a tail end of the discharged hot gas stream isolating shield 248 to limit possible rotation of the valve claw member 245 (for example, a frictional force may cause the valve claw member 245 to have a small tendency to rotate) and maintain the valve claw and a position, where the hot gas stream discharge port 130 is covered, at a consistent angle (in order to facilitate understanding, referring also to FIG. 25 which apparently shows the notch groove 249). Those skilled in the art could realize that the device for adjusting the discharge amount of hot gas stream may also have other various forms. The forms are no longer enumerated one by one.

An independent protective cover 260 may also be disposed for the intake fan 210 in the vortex type cold and hot gas separating device 200 according to the second embodiment of the present invention. Therefore, the isolation shield 160 of the vortex type cold and hot gas separating device 200 is not provided with members such as ribs, rib plates and/or annular rings as shown in FIG. 8. These structures are all well known, or readily understood and implemented by those skilled in the art and thus will be no longer unnecessarily described.

Figure 12:
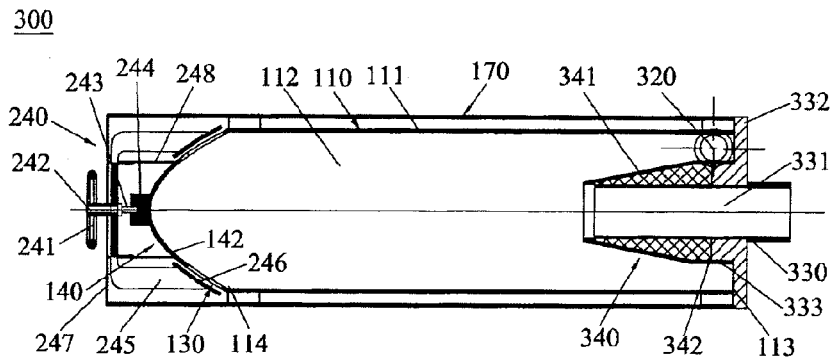
FIG. 12 is a schematic section view of a vortex type cold and hot gas separating device according to a third embodiment of the present invention.
Figure 13:
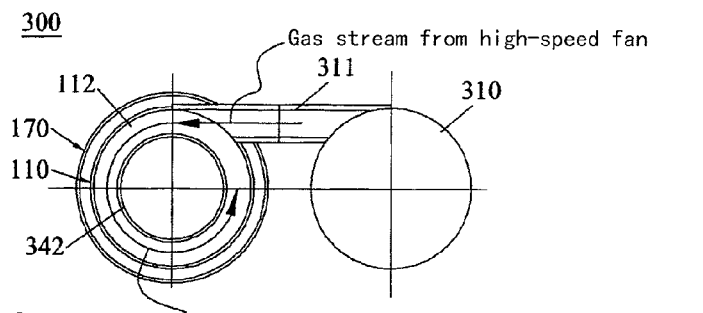
FIG. 13 is a schematic diagram of a vortex forming process of the vortex type cold and hot gas separating device of FIG. 12.
Figure 14:
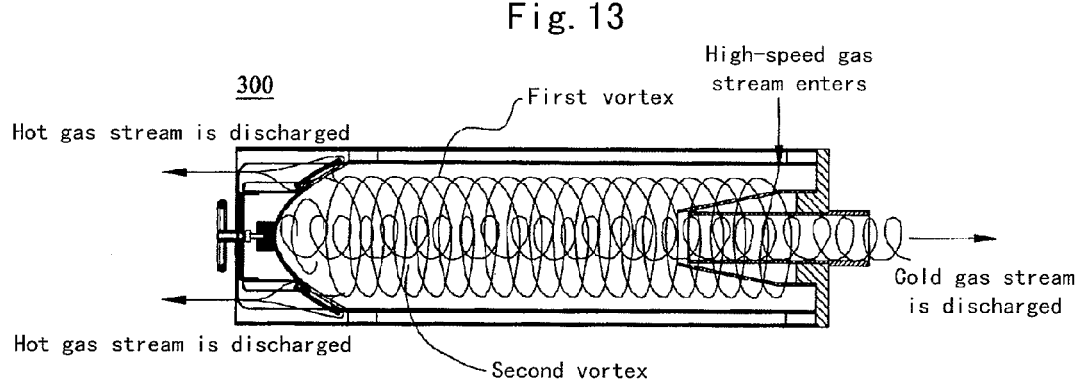
FIG. 14 is a schematic section view of the vortex type cold and hot gas separating device of FIG. 12, in which a flow process of gas in the vortex type cold and hot gas separating device is shown and section lines of a preferable thermal insulation material in a cyclone sleeve are omitted for the purpose of clearness.

FIGS. 12-14 show schematic views of a vortex type cold and hot gas separating device 300 according to a third embodiment of the present invention.

As shown in FIGS. 12-14, the vortex type cold and hot gas separating device 300 according to the third embodiment of the present invention comprises: a body 110, a fan 310 (not shown in FIG. 12, referring to FIG. 13 or 15) disposed outside the body, an gas inlet 320 disposed in the body 110, a hot gas stream discharge port 130, a vortex return device 140, and a cold gas stream discharge central tubular mount 330 with a cold gas stream discharge passage. The fan 310 used in the present invention is preferably a high-speed fan, and a velocity of gas stream stably outputted by the high-speed fan can reach Mach 1/8 or more, for example specifically may be Mach 1/7, Mach 1/6, Mach 1/5, Mach 1/4, Mach 1/3, Mach 1/2, 1/2, Mach 2/3, Mach 3/4, Mach 4/5, Mach 5/6, Mach 6/7, Mach 7/8, even may approach Mach 9/10 (the so-called sonic barrier critical value), and may be any specific numerical value or any interval between the above-mentioned any two numerical values.

Similar to the first and second embodiments, the body 110 of the vortex type cold and hot gas separating device 300 also has a cylindrical inner wall surface 111 defining a cylindrical inner chamber 112. The cylindrical inner chamber 112 has a first end 113 and a second end 114 opposite to the first end in an axial direction of the cylindrical inner chamber. Furthermore, as can be clearly seen from FIG. 12, the hot gas stream discharge port 130 and the vortex return device 140 in the third embodiment of the present invention are substantially the same as those in the second embodiment of the present invention. In addition, as could be realized by those skilled in the art, the same forms as those in the first embodiment of the present invention may also be adopted in the hot gas stream discharge port 130 and the vortex return device 140 in the third embodiment of the present invention. The same or similar components or parts will not be unnecessarily described for the purpose of clearness and conciseness, and can all be readily understood according to the above description.

The vortex type cold and hot gas separating device 300 according to the third embodiment of the present invention differs mainly in the intake manner and formation manner of the first vortex from the vortex type cold and hot gas separating devices 100 and 200 according to the first and second embodiments of the present invention.

Specifically, a gas inlet 320 is disposed in the body 110 in the vortex type cold and hot gas separating device 300 and adjacent to the first end 113 of the cylindrical inner chamber 112. A wind guiding tube 311 of the fan 310 is connected to the gas inlet 320. The gas inlet 320 is disposed to jet gas stream outputted by the fan 310 into the cylindrical inner chamber 112 substantially in a tangent direction of a circumference of the cylindrical inner chamber 112 to form a first vortex rotating along the cylindrical inner wall surface 111 and traveling towards the second end 114 of the cylindrical inner chamber 112.

In addition, the vortex type cold and hot gas separating device 300 comprises a cold gas stream discharge central tubular mount 330 with a cold gas stream discharge passage 331. The cold gas stream discharge central tubular mount 330 is disposed at the first end 113 of the cylindrical inner chamber 112, and extends axially into the cylindrical inner chamber along a central axis of the cylindrical inner chamber 112. The cold gas stream discharge passage 331 receives the second vortex to isolate the second vortex from the first vortex, and discharges gas of the second vortex out of the vortex type cold and hot gas separating device 300.

Preferably, the vortex type cold and hot gas separating device 300 further comprises a tubular-mount fixation flange 332 with a central through hole. The cold gas stream discharge central tubular mount 330 passes through the central through hole of the tubular-mount fixation flange 332 and is fixed to the body 110 of the vortex type cold and hot gas separating device 300 through the tubular-mount fixation flange 332.

In particular, the vortex type cold and hot gas separating device 300 preferably further comprises a cyclone sleeve 340. The cyclone sleeve 340 is disposed around the cold gas stream discharge central tubular mount 330 in the cylindrical inner chamber 112 and has a truncated cone-shaped part 341, tapering towards the second end 114 of the cylindrical inner chamber 112, to guide rotation of the first vortex, thereby reducing a turbulent flow loss of the first vortex. A cylindrical part 342 extends at a position of the truncated cone-shaped part 341 of the cyclone sleeve 340 where the truncated cone-shaped part has a maximal diameter. A distance between a boundary circumference between the cylindrical part 342 and the truncated cone-shaped part 341 and the first end 113 of the cylindrical inner chamber 112 in the axial direction of the cylindrical inner chamber 112 is preferably larger than or equal to a maximal distance between a perimeter of the gas inlet 320 and the first end 113 of the cylindrical inner chamber 112. In a preferable embodiment of the present invention, the gas inlet 320 may be disposed close to an inside surface of the tubular-mount fixation flange 332. Furthermore, a radius of the boundary circumference may be preferably set such that an elongation line of the gas inlet at a lowermost point is substantially tangent to the boundary circumference. An end of the cylindrical part 342 of the cyclone sleeve 340 is preferably fitted over and fixed to an annular step 333, which protrudes towards an inside of the cylindrical inner chamber 112, of the tubular-mount fixation flange 332. A center hole of the annular step 333 constitutes a part of the central through hole of the tubular-mount fixation flange 332. The cold gas stream discharge central tubular mount 330 passes through the central through hole of the tubular-mount fixation flange 332.

More preferably, a thermal insulation material (for example a porous thermal insulation material, a fiber thermal insulation material, or the like) may be disposed in a space between the cyclone sleeve 340 and the cold gas stream discharge central tubular mount 330 to thermally insulate the second vortex in the central through hole of the cold gas stream discharge central tubular mount 330 from the first vortex on a radial outside of the cyclone sleeve 340.

Figure 15:
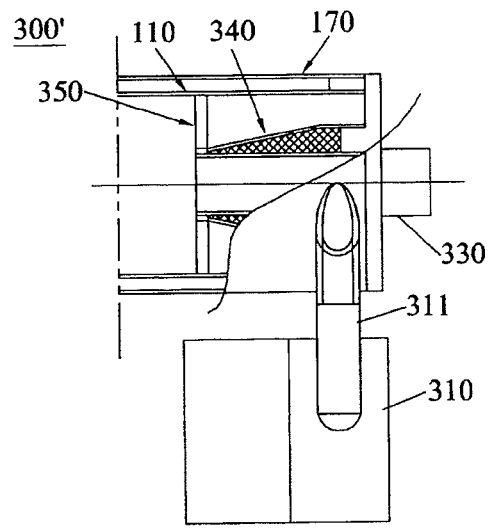
FIG. 15 is a schematic partial section view of a vortex type cold and hot gas separating device according to a modification of the third embodiment of the present invention, in which an axial rectification device is added to the vortex type cold and hot gas separating device, and FIG. 15 also shows a fan disposed outside a body of the vortex type cold and hot gas separating device.
Figure 16:
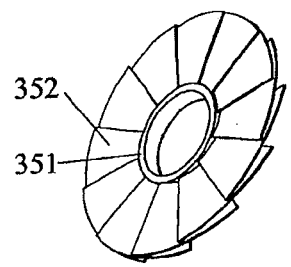
FIG. 16 is a schematic perspective view of the axial rectification device used in the vortex type cold and hot gas separating device of FIG. 15.
Figure 17:
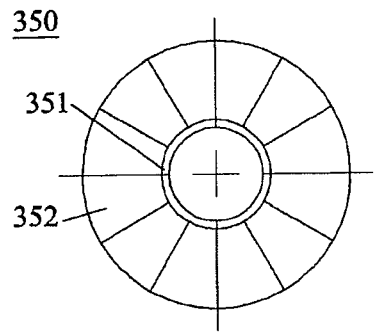
FIG. 17 is a schematic side view of the axial rectification device used in the vortex type cold and hot gas separating device of FIG. 15.
Figure 18:
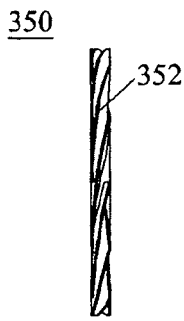
FIG. 18 is a schematic end view of the axial rectification device used in the vortex type cold and hot gas separating device of FIG. 15.
Figure 19:
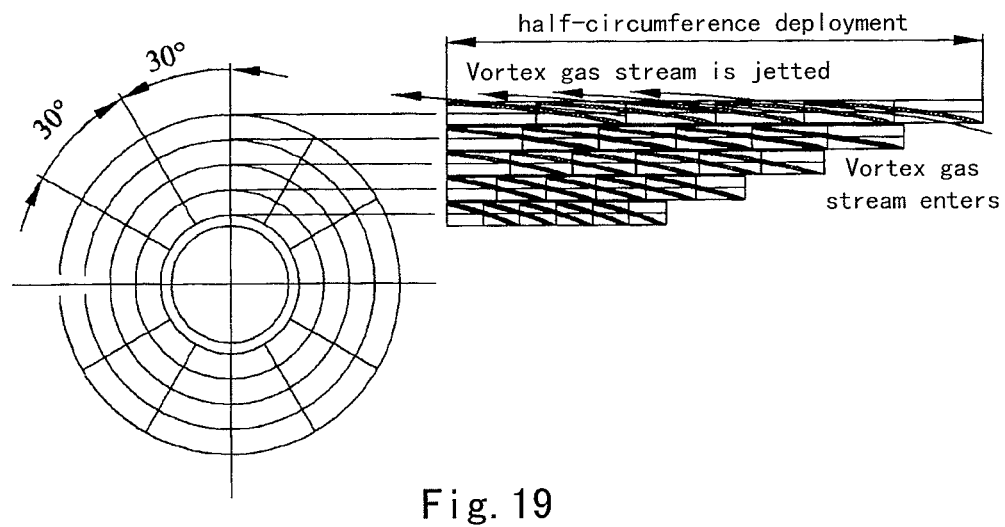
FIG. 19 is a schematic half-circumference planar deploying drawing of the axial rectification device used in the vortex type cold and hot gas separating device of FIG. 15.

FIG. 15 is a schematic partial section view of a vortex type cold and hot gas separating device 300' according to a modification of the third embodiment of the present invention, in which an axial rectification device 350 is added to the vortex type cold and hot gas separating device 300'. The axial rectification device 350 is fixed to an end portion, which extends into the cylindrical inner chamber 112, of the cold gas stream discharge central tubular mount 330 to rectify the first vortex passing through the axial rectification device 350, so that a turbulent flow loss of the first vortex is decreased and flow rates of the swirling gas of the first vortex at points in a circumferential direction are more uniform after rectifying than before rectifying.

FIGS. 16-19 show various detailed schematic views of the axial rectification device 350 used in the vortex type cold and hot gas separating device 300'.

As shown in FIGS. 16-19, the axial rectification device 350 is a dish-shaped spiral member. The dish-shaped spiral member has a central annular member 351. A plurality of sector-shaped flow guiding plates 352 extending radially outwards perpendicular to an outer circumferential surface of the central annular member and distributed uniformly in a circumferential direction are fixed on the outer circumferential surface of the central annular member. The plurality of sector-shaped flow guiding plates 352 are disposed such that a substantially wedge-shaped gap is formed between adjacent two of the sector-shaped flow guiding plates to allow gas stream to pass therethrough. After the first vortex is jetted through the wedge-shaped gaps, the rectified first vortex is formed.

Preferably, the sector-shaped flow guiding plates 352 each have the same size and shape. Each of the sector-shaped flow guiding plates 352 preferably has an angle of sector of 40-80°, for example 60°. An overlap of adjacent two of the sector-shaped flow guiding plates 352 on an axial projection preferably has an area of $1/3$-$2/3$ of an area of each sector-shaped flow guiding plate. For example, the overlap may have an area of $1/2$ of the area of each sector-shaped flow guiding plate. A wedge angle of a pointed portion of each wedge-shaped gap and a spacing of a narrowest portion of each wedge-shaped gap are set so that they facilitate reduction of a turbulent flow loss of the first vortex and flow rates of the swirling gas of the first vortex at points in a circumferential direction are more uniform after rectifying than before rectifying. Specific design may be carried out by referring to a form of the planar deploying drawing of FIG. 19 according to relevant knowledge of the fluid mechanics in the prior art. The specific design will be easily performed by those skilled in the art according to the contents of the present application and the corresponding knowledge of the fluid mechanics, and thus will not be unnecessarily described.

Each of the sector-shaped flow guiding plates 352 may have a simple flat-plate shape. The sector-shaped flow guiding plate 352 may also be preferably a flow guiding plate having a streamlined curve-shaped cross-section. Specific design of the curve shape will be easily performed by those skilled in the art according to the contents of the present application and the corresponding knowledge of the fluid mechanics, and thus will not be unnecessarily described.

Figure 20:
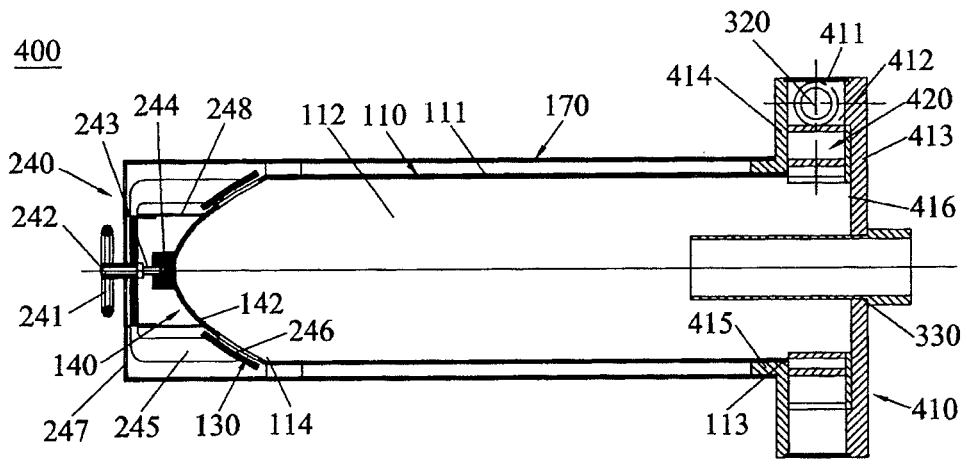
FIG. 20 is a schematic section view of a vortex type cold and hot gas separating device according to a fourth embodiment of the present invention.

FIG. 20 shows a schematic section view of a vortex type cold and hot gas separating device 400 according to a fourth embodiment of the present invention.

As shown in FIG. 20, the vortex type cold and hot gas separating device 400 according to the fourth embodiment of the present invention is generally similar to the vortex type cold and hot gas separating devices 300 or 300' according to the third embodiment of the present invention, and differs mainly in the intake manner and formation manner of the first vortex from the vortex type cold and hot gas separating devices 300 and 300' according to the third embodiment of the present invention.

Specifically, the vortex type cold and hot gas separating device 400 is provided with an end intake and rectification cover 410. The gas inlet 320 is disposed in the end intake and rectification cover 410 rather than the body 110. The end intake and rectification cover 410 is fixed to the body 110 at the first end 113 of the cylindrical inner chamber 112. A wind guiding tube 311 of the fan 310 is connected to the gas inlet 320 to jet gas stream outputted by the fan into the end intake and rectification cover 410. The end intake and rectification cover 410 is disposed to form the gas stream outputted by the fan into an initial rotary gas stream and rectify the initial rotary gas stream into a first vortex rotating along the cylindrical inner wall surface 111 and traveling towards the second end 114 of the cylindrical inner chamber 112. It is not necessary to dispose the cyclone sleeve 340 and the axial rectification device 350 in the vortex type cold and hot gas separating device 400, but a good rectification effect can also be obtained. In addition, if necessary, measures of thermal insulation can also be taken for a necessary portion of the cold gas stream discharge central tubular mount 330 of the vortex type cold and hot gas separating device 400 (for example, a sleeve with a slightly bigger diameter is fitted over the cold gas stream discharge central tubular mount and a space between the sleeve and an outer circumferential wall of the cold gas stream discharge central tubular mount is filled with a thermal insulation material), or the cold gas stream discharge central tubular mount 330 itself of the vortex type cold and hot gas separating device 400 is designed to have thermal insulation capacity (for example, a tube wall of the cold gas stream discharge central tubular mount is designed as a double-layer hollow tube wall and a sandwich of the tube wall can be vacuumized or filled with a thermal insulation material).

Preferably, the end intake and rectification cover 410 has an annular housing wall 411 defining a cavity 412 therein. The cavity 412 has a larger diameter than the cylindrical inner chamber 112 of the body 110 of the vortex type cold and hot gas separating device 400. The cavity 412 has the same central axis as the cylindrical inner chamber 112, and is in direct communication with the cylindrical inner chamber 112. The gas inlet 320 is disposed in the annular housing wall 411, and the gas inlet 320 is disposed to jet gas stream outputted by the fan into the cavity substantially in a tangent direction of a circumference of the cavity 412 of the end intake and rectification cover 410 to form the initial rotary gas stream. Particularly, the end intake and rectification cover 410 has a radial rectification device 420 disposed in the cavity 412 of the end intake and rectification cover and having the same central axis as the cavity. The radial rectification device is disposed to receive the initial rotary gas stream and rectify the initial rotary gas stream into the first vortex.

Preferably, the end intake and rectification cover 410 further comprises a tubular-mount fixation flange 413 with a central through hole. The cold gas stream discharge central tubular mount 330 passes through the central through hole of the tubular-mount fixation flange 413 and is fixed to an outside end of the annular housing wall 411 of the end intake and rectification cover through the tubular-mount fixation flange 413. Preferably, the radial rectification device 420 is fixed on an inside surface of the tubular-mount fixation flange 413.

Preferably, the end intake and rectification cover 410 further comprises an end intake and rectification cover fixation flange 414. An inside end of the annular housing wall 411 of the end intake and rectification cover 410 is fixed to an outer edge part of the end intake and rectification cover fixation flange 414, and an annular step 415 of the end intake and rectification cover fixation flange 414 is fixed to the outer circumferential wall of the body 110 at the first end 113 of the cylindrical inner chamber 112.

Figure 21:
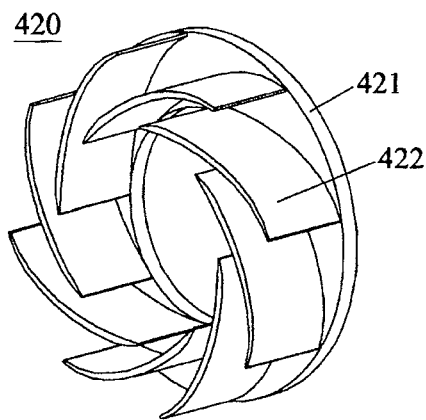
FIG. 21 is a schematic perspective view of a radial rectification device used in the vortex type cold and hot gas separating device of FIG. 20.

Referring now to FIG. 21, FIG. 21 shows a schematic perspective view of a radial rectification device 420 of the vortex type cold and hot gas separating device 400 of FIG. 20.

As shown in FIG. 21, the radial rectification device 420 has a base plate 421 which is preferably a circular ring-shaped flat plate. A plurality of curve-shaped flow guiding plates 422 perpendicular to a side surface of the base plate and distributed uniformly in a circumferential direction are fixed on the side surface of the base plate 421. The base plate 421 may also have any other appropriate shape so long as the curve-shaped flow guiding plates can be fixed on the surface of the base plate and the base plate has a center hole, through which the cold gas stream discharge central tubular mount 330 can pass, at a central portion.

Figure 22:
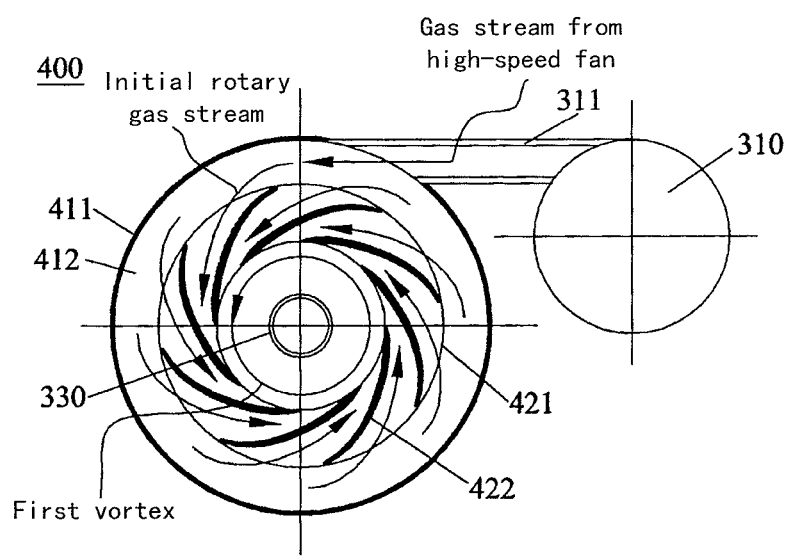
FIG. 22 is a schematic diagram of a vortex forming and radial rectification process of the vortex type cold and hot gas separating device of FIG. 20.

The curve-shaped flow guiding plates 422 are disposed to rectify the initial rotary gas stream into the first vortex having a reduced rotational diameter, and such that the first vortex has not only a higher velocity but also a less turbulent flow loss than the initial rotary gas stream, and such that flow rates of the swirling gas of the first vortex at points in a circumferential direction are more uniform than those of the initial rotary gas stream. A tapered, substantially wedge-shaped gap is formed between adjacent two of the curve-shaped flow guiding plates 422 to allow gas stream to pass therethrough. A gas stream outlet is formed at a narrowest pointed portion of the wedge-shaped gap. The gas stream outlet is preferably disposed to be able to jet the rectified gas substantially in a tangent direction of a circumference of the cylindrical inner chamber to form the first vortex. For this, reference may be made to FIG. 22 which schematically shows a rectifying process of the radial rectification device 420. Preferably, the curve-shaped flow guiding plates 422 are each disposed to have the same axial width as each other in an axial direction perpendicular to the base plate 421, and the axial width is substantially equal to an axial length of the cavity 412 of the end intake and rectification cover 410. A bisectional plane bisecting the curve-shaped flow guiding plates 422 in a direction of the axial width and a central axis of the gas inlet 320 may preferably lie in the same plane. The curve-shaped flow guiding plates 422 are preferably disposed such that an elongation line of the gas inlet 320 at a lowermost point is substantially tangent to an outer enveloping circumference of outer edges of all of the curve-shaped flow guiding plates. Alternatively, the elongation line may also be slightly higher than or lower than the outer enveloping circumference of the curve-shaped flow guiding plates. An inner enveloping circumference of inner edges of all of the curve-shaped flow guiding plates is preferably concentric with the cylindrical inner chamber 112, and further preferably has a diameter substantially equal to or slightly smaller than that of the cylindrical inner chamber 112.

Particularly, in the present invention, a cross-sectional shape, in a flow guiding direction, of each of the curve-shaped flow guiding plates 422 of the radial rectification device 420 is formed by enclosure of an inside curve, an outside curve, and an end connection and transition line. As could be realized and understood by those skilled in the art, since the curve-shaped flow guiding plate assumes a thin-plate shape as a whole, the end connection and transition line at ends of the inside curve and the outside curve of the curve-shaped flow guiding plate is very short, influence of the end connection and transition line on a flow guiding effect of the curve-shaped flow guiding plate 422 is little, and thus it is not necessary to discuss the end connection and transition line. Therefore, shapes of the inside curve and the outside curve of the curve-shaped flow guiding plate 422 will be mainly discussed below.

Figure 23:
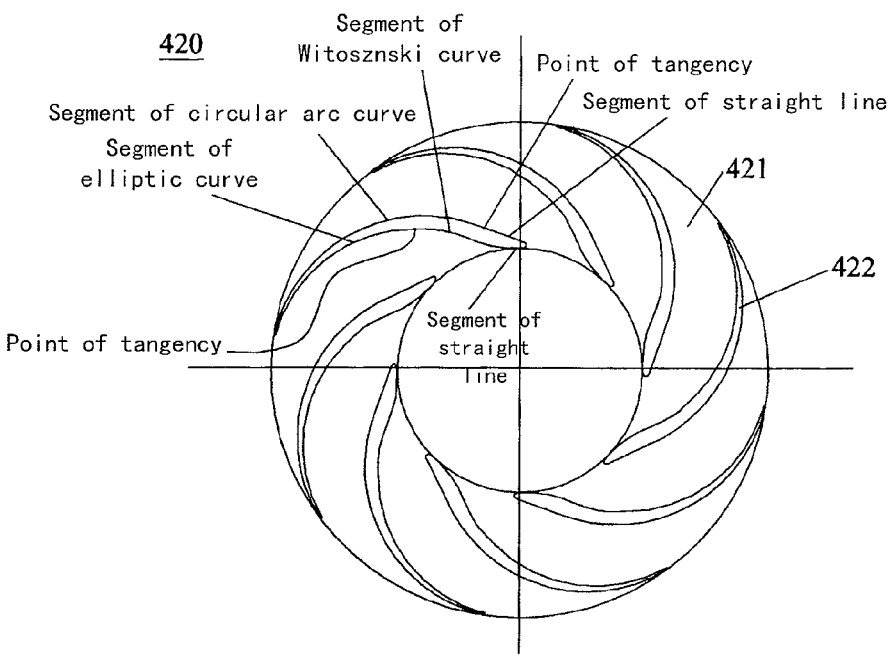
FIG. 23 is a schematic plan view of the radial rectification device used in the vortex type cold and hot gas separating device of FIG. 20.

Referring to FIG. 23, the inside curve of the radial rectification device 420 is preferably disposed to include a segment of elliptic curve, a segment of Witosznski curve, and a segment of straight line located at the gas stream outlet of the wedge-shaped gap. Preferably, the segment of elliptic curve and the segment of Witosznski curve smoothly transit to each other. As shown in FIG. 23, the inside curve of each curve-shaped flow guiding plate 420 first begins at the segment of elliptic curve on the radial outside, then smoothly transits to the segment of Witosznski curve, and after that smoothly transits to the segment of straight line of the inside curve. As could be understood by those skilled in the art, the segment of elliptic curve may be connected directly to the segment of Witosznski curve with smooth transition formed therebetween, but the segment of elliptic curve may also be connected to the segment of Witosznski curve through a segment of transition curve with smooth transition formed between the segment of elliptic curve and the segment of Witosznski curve. Preferably, the segment of Witosznski curve and the segment of straight line of the inside curve are connected directly to each other to smoothly transit to each other.

Preferably, the outside curve is disposed to include a segment of circular arc curve and a segment of straight line located near the gas stream outlet of the wedge-shaped gap. The segment of circular arc curve and the segment of straight line of the outside curve are preferably connected directly to each other to smoothly transit to each other.

Preferably, an elongation line of the segment of elliptic curve of the inside curve of each curve-shaped flow guiding plate 422 is substantially tangent to the outer enveloping circumference of the outer edges of all of the curve-shaped flow guiding plates, and the segment of circular arc curve of the outside curve of each curve-shaped flow guiding plate 422 may also be substantially tangent to the outer enveloping circumference to ensure that gas stream in the cavity 412 flows into a flow guiding region, formed by the wedge-shaped gap, at the gas stream inlet in tangent directions of the inside curve and the outside curve. (Those skilled in the art will realize that since each curve-shaped flow guiding plate is relatively thin at the outer edge, a point of tangency between the segment of elliptic curve of the inside curve and the outer enveloping circumference and a point of tangency between the segment of circular arc curve of the outside curve and the outer enveloping circumference are very close to each other and even can be regarded the same. Hence, in fact the tangent directions of the inside curve and the outside curve at the gas stream inlet are substantially the same.)

Preferably, the segment of straight line of the inside curve of each curve-shaped flow guiding plate 422 is substantially tangent to the inner enveloping circumference of the inner edges of all of the curve-shaped flow guiding plates, and an elongation line of the segment of straight line of the outside curve of each curve-shaped flow guiding plate 422 may also be substantially tangent to the inner enveloping circumference to ensure that gas stream from the wedge-shaped gap can be jetted substantially in a tangent direction of the inner enveloping circumference, thereby forming the first vortex.

In some embodiments of the present invention, an outer circumference of the circular ring-shaped base plate 421 of the radial rectification device 420 may be disposed to coincide with the outer enveloping circumference of the curve-shaped flow guiding plate, while an inner circumference of the circular ring-shaped base plate 421 may be disposed to coincide with the inner enveloping circumference of the curve-shaped flow guiding plate.

The above curve-shaped flow guiding plate particularly designed is very beneficial to effective reduction of a turbulent flow loss and enhancement of uniformity of flow rates of the swirling gas at points in a circumferential direction in the device of the present invention.

Figure 24:
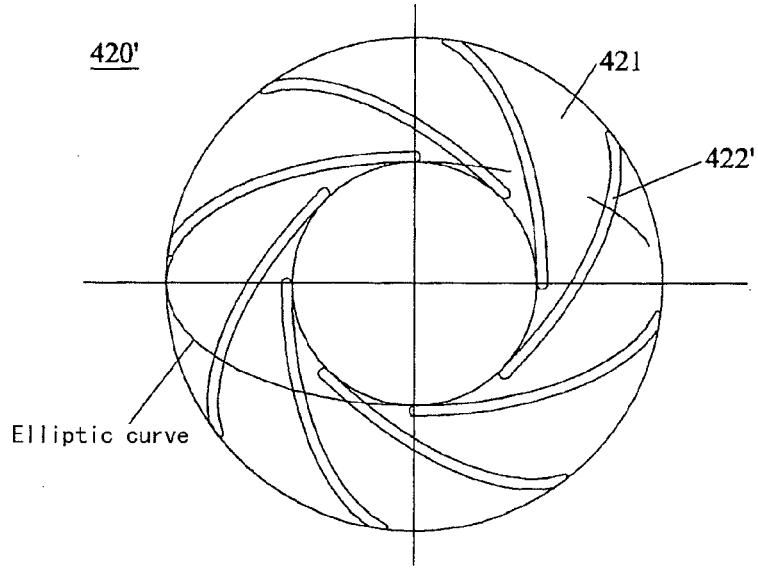
FIG. 24 is a schematic plan view of another radial rectification device usable in the vortex type cold and hot gas separating device of FIG. 20.

Alternatively, as shown in FIG. 24, another radial rectification device 420' may also be adopted in the vortex type cold and hot gas separating device 400 according to the fourth embodiment of the present invention. A curve-shaped flow guiding plate 422' of the radial rectification device 420' has a relatively simple cross-sectional shape, and an inside curve and an outside curve each of which is formed by a segment of elliptic curve. Such an alternative radial rectification device 420' is advantageous in that it has a simple structure, can be easily manufactured, and can also effectively reduce a turbulent flow loss and enhance uniformity of flow rates of the swirling gas at points in a circumferential direction to a certain degree.

In addition, as shown in FIG. 20, the radial rectification device 420 is preferably fixed in an annular recess 416 on an inside surface of the tubular-mount fixation flange 413 through the base plate 421. The annular recess 416 has a recess depth which is preferably substantially equal to a thickness of the base plate 412.

Figure 25:
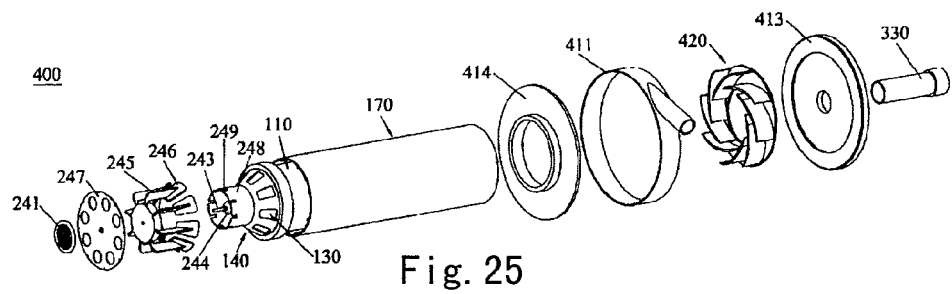
FIG. 25 is a schematic exploded perspective view of the vortex type cold and hot gas separating device of FIG. 20.
Figure 26:
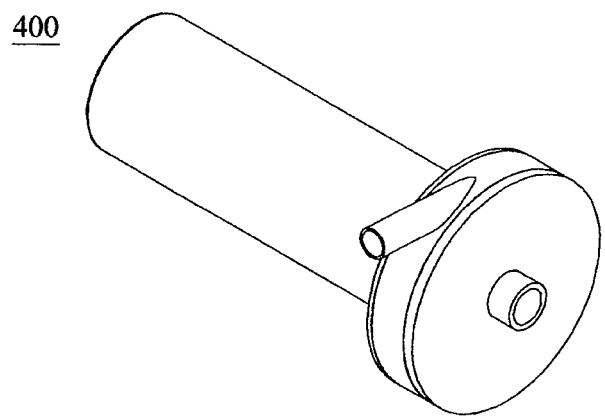
FIG. 26 is a schematic perspective view of the vortex type cold and hot gas separating device of FIG. 20 which has been assembled.

In order to more visually understand the structure of the vortex type cold and hot gas separating device 400 of FIG. 20, reference may also be made to FIG. 25 which shows a schematic exploded perspective view of the vortex type cold and hot gas separating device 400. Reference may be made to FIG. 26 for the assembled vortex type cold and hot gas separating device 400.

Figure 27:
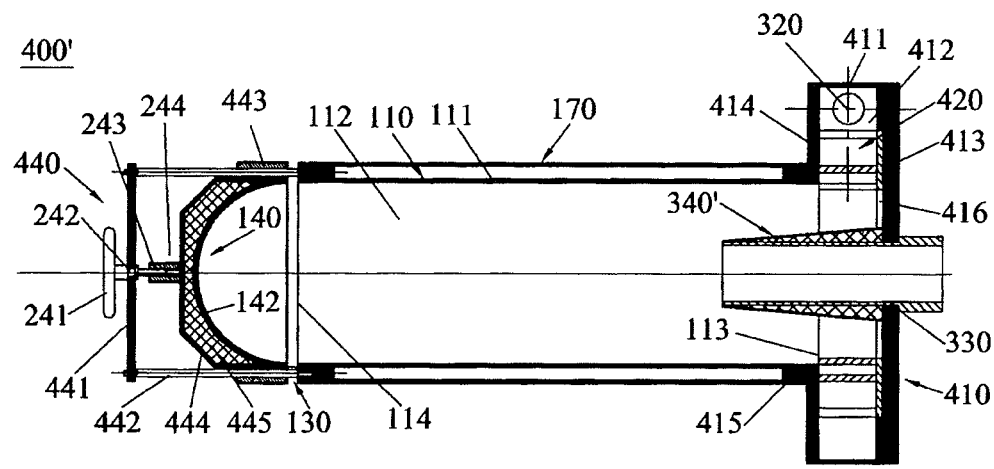
FIG. 27 is a schematic section view of a vortex type cold and hot gas separating device according to a modification of the fourth embodiment of the present invention, in which the gas stream focusing and reflecting surface has a shape of a concave sphere.

FIG. 27 is a schematic section view of a vortex type cold and hot gas separating device 400' according to a modification of the fourth embodiment of the present invention. In the vortex type cold and hot gas separating device 400', an alternative device 440 for adjusting a discharge amount of hot gas stream is adopted. The adjusting device 440 also comprises a handwheel 241, a rod body 242, and a threaded hole mount 244. A slide bar fixation flange 441 is fitted over the smooth rod segment between the step segment of the rod body 242 and the protruding connection part of the handwheel 241, through a central through hole of the slide bar fixation flange 441 by means of a clearance fit (apparently, a diameter of the central through hole is also preferably larger than a diameter of the smooth rod segment, but smaller than a diameter of the step segment and a diameter of the protruding connection part of the handwheel 241), while ensuring that a spacing between the step segment of the rod body 242 and the protruding connection part of the handwheel 241 is substantially equal to or slightly larger than a thickness of the slide bar fixation flange 441. A plurality of slide bars 442 are fixed to the slide bar fixation flange 441. The slide bars 442 extend through corresponding through holes in a slide base 443, and ends of the slide bars are fixed relative to the body 110. The gas stream focusing and reflecting surface 142 with a shape of a concave sphere is fixed to a radial inside of the slide base 443. A thermal insulation layer 445 is particularly disposed outside the gas stream focusing and reflecting surface 142 to avoid influence of an environment on a temperature of gas stream located at the gas stream focusing and reflecting surface (the thermal insulation layer 445 is mainly used to thermally insulate the second vortex gradually formed and gathered at the gas stream focusing and reflecting surface and keep it cold). The thermal insulation layer 445 may be formed of any appropriate thermal insulation material, for example a porous thermal insulation material or a fiber thermal insulation material. A thermal insulation material fixation cover 444 is disposed outside the thermal insulation layer 445. The thermal insulation material fixation cover 444 is fixed to the slide base 443 while the threaded hole mount 244 is fixed to the thermal insulation material fixation cover 444. As a result, the screw segment 243 of the rod body 242 can be rotated and axially moved in the threaded hole mount 244 by rotating the handwheel 241, so that the slide base 443 axially slides on the slide bars 442 to adjust an opening degree of the annular hot gas stream discharge port 130 (as shown in FIG. 27, the hot gas stream discharge port 130 in the example is defined by a gap between the body 110 and the slide base 443), and thus a discharge amount of hot gas stream. For example, a temperature and a flow rate of discharged cold gas stream can be adjusted by adjusting the discharge amount of hot gas stream.

Further, a cyclone sleeve 340' is disposed on the cold gas stream discharge central tubular mount 330. The cyclone sleeve 340' is similar to the cyclone sleeve 340 in the third embodiment of the present invention, but does not have a cylindrical part 342. A thermal insulation material (for example a porous thermal insulation material, a fiber thermal insulation material, or the like) is also preferably disposed in a space between the cyclone sleeve 340' and the cold gas stream discharge central tubular mount 330 to thermally insulate the second vortex in the central through hole of the cold gas stream discharge central tubular mount 330 from the first vortex on a radial outside of the cyclone sleeve 340'.

Figure 28:
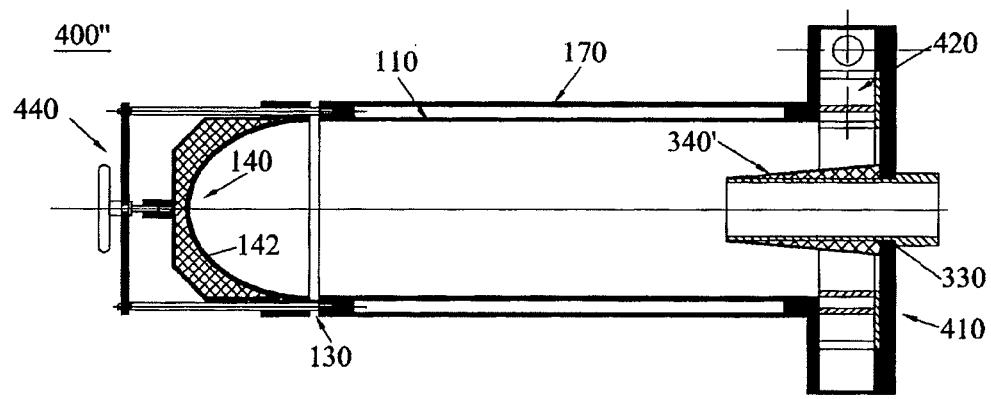
FIG. 28 is a schematic section view of a vortex type cold and hot gas separating device similar to FIG. 27, but in which the gas stream focusing and reflecting surface has a shape of a concave ellipsoid.
Figure 29:
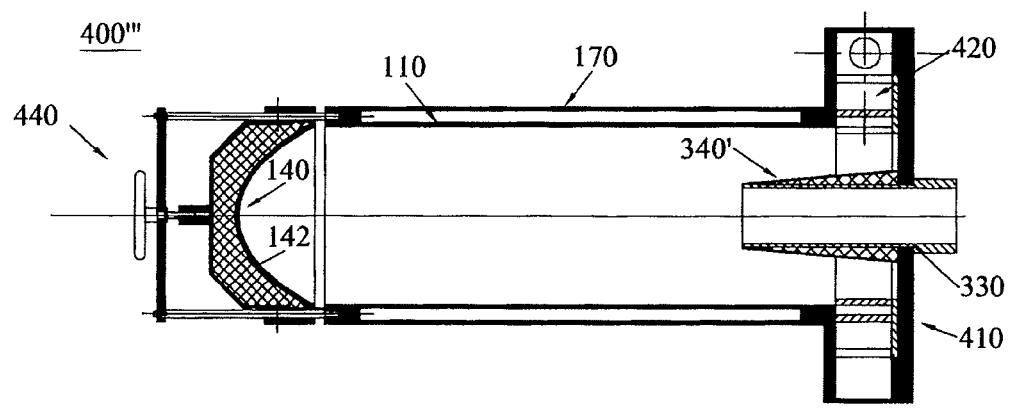
FIG. 29 is a schematic section view of a vortex type cold and hot gas separating device similar to FIG. 27, but in which the gas stream focusing and reflecting surface has a shape of a concave paraboloid.
Figure 30:
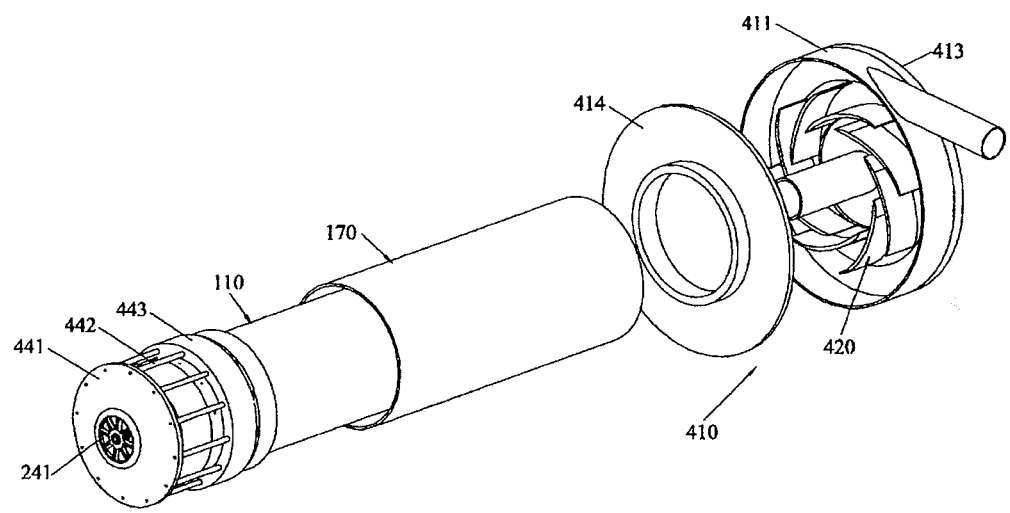
FIG. 30 is a schematic partially-exploded perspective view of the vortex type cold and hot gas separating devices of FIGS. 27-29 (since the gas stream focusing and reflecting surface is not viewable in FIG. 30, this figure alone can be used to show the similar vortex type cold and hot gas separating devices in FIGS. 27-29).

FIGS. 28 and 29 also shows other two vortex type cold and hot gas separating devices 400" and 400' similar to that of FIG. 27. The vortex type cold and hot gas separating devices 400" and 400' of FIGS. 28 and 29 differ from the vortex type cold and hot gas separating device 400' of FIG. 27 in that a gas stream focusing and reflecting surface 142 having a shape of a concave ellipsoid and a gas stream focusing and reflecting surface 142 having a shape of a concave paraboloid are adopted in them, respectively. FIG. 30 shows a schematic partially-exploded perspective view of the vortex type cold and hot gas separating devices of FIGS. 27-29. A person skilled in the art could understand that since the gas stream focusing and reflecting surface is not viewable in FIG. 30, FIG. 30 can be actually used as the common schematic partially-exploded perspective view of the three similar vortex type cold and hot gas separating devices in FIGS. 27-29.

Particularly, those skilled in the art should realize that the various vortex return devices having gas stream focusing and reflecting surfaces with the shape of the concave curve disclosed in the present invention can be not only applied to the embodiments or their modifications disclosed above, but also used in the vortex type cold and hot gas separating device, in which any other intake and vortex forming devices which are known or will be known are adopted, so long as the intake device or the vortex forming device can input external gas into a cylindrical cavity of the body to form the first vortex. Such intake and vortex forming devices may include, but not limited to, various devices for forming the first vortex by using a gas compressor or any other compressed air source as a gas source for intake in the prior art, in addition to the corresponding devices disclosed in the embodiments and their modifications of the present invention.

Although the exemplary preferred embodiments have been shown and described, it would be appreciated by a person skilled in the art that many other modifications or changes in accord with the embodiments can be directly determined or deducted according to the contents disclosed in the present application without departing from spirit and scope of the present invention. Therefore, the scope of the present invention should be considered to cover all of the modifications or changes.

What is claimed is:

1. A vortex type cold and hot gas separating device, comprising:

a body having a cylindrical inner wall surface, the cylindrical inner wall surface defining a cylindrical inner chamber, the cylindrical inner chamber having a first end and a second end opposite to the first end in an axial direction of the cylindrical inner chamber;

a fan disposed outside the body;

an end intake and rectification cover with a gas inlet which is fixed to the body at the first end of the cylindrical inner chamber, a wind guiding tube of the fan is connected to the gas inlet to jet gas stream outputted by the fan into the end intake and rectification cover, and the end intake and rectification cover is disposed to form the gas stream outputted by the fan into an initial rotary gas stream and rectify the initial rotary gas stream into a first vortex rotating along the cylindrical inner wall surface and traveling towards the second end of the cylindrical inner chamber;

a hot gas stream discharge port disposed to be located at or adjacent to an edge of the second end of the cylindrical inner chamber so that a part of gas of the first vortex traveling to the hot gas stream discharge port is discharged out of the cylindrical inner chamber through the hot gas stream discharge port;

a vortex return device disposed to be located at the second end of the cylindrical inner chamber to return the remaining gas of the first vortex which is not discharged from the hot gas stream discharge port, thereby forming a second vortex traveling towards the first end of the cylindrical inner chamber through a cyclone core of the first vortex; and a cold gas stream discharge central tubular mount with a cold gas stream discharge passage which is disposed at the first end of the cylindrical inner chamber, extends axially inwards into the cylindrical inner chamber along a central axis of the cylindrical inner chamber, and extends axially outwards outside the end intake and rectification cover along the central axis of the cylindrical inner chamber, wherein the cold gas stream discharge passage receives the second vortex to isolate the second vortex from the first vortex, and discharges gas of the second vortex out of the vortex type cold and hot gas separating device, and a temperature of the gas discharged from the hot gas stream discharge port is higher than a temperature of the gas discharged from the cold gas stream discharge passage, wherein an annular space is formed between an outer surface of a portion of the cold gas stream discharge passage extending inwards into the cylindrical inner chamber and the cylindrical inner wall surface of the body, and is configured such that the first vortex travels through the annular space towards the second end of the cylindrical inner chamber.

2. The vortex type cold and hot gas separating device of claim 1, wherein the end intake and rectification cover comprises:

an annular housing wall defining a cavity therein, wherein the cavity has a larger diameter than the cylindrical inner chamber of the body of the vortex type cold and hot gas separating device, and the same central axis as the cylindrical inner chamber, and is in direct communication with the cylindrical inner chamber, the gas inlet is disposed in the annular housing wall, and the gas inlet is disposed to jet gas stream outputted by the fan into the cavity of the end intake and rectification cover substantially in a tangent direction of a circumference of the cavity of the end intake and rectification cover to form the initial rotary gas stream; and a radial rectification device disposed in the cavity of the end intake and rectification cover and having the same central axis as the cavity of the end intake and rectification cover, and the radial rectification device is disposed to receive the initial rotary gas stream and rectify the initial rotary gas stream into the first vortex.

3. The vortex type cold and hot gas separating device of claim 2, wherein the end intake and rectification cover further comprises a tubular-mount fixation flange with a central through hole, wherein the cold gas stream discharge central tubular mount passes through the central through hole of the tubular-mount fixation flange and is fixed to an outside end of the annular housing wall of the end intake and rectification cover through the tubular-mount fixation flange, and the radial rectification device is fixed on an inside surface of the tubular-mount fixation flange.

4. The vortex type cold and hot gas separating device of claim 2, wherein the radial rectification device has a base plate, wherein a plurality of curve-shaped flow guiding plates perpendicular to a side surface of the base plate and distributed uniformly in a circumferential direction are fixed on the side surface of the base plate, and the curve-shaped flow guiding plates are disposed to rectify the initial rotary gas stream into the first vortex having a reduced rotational diameter, and such that the first vortex has not only a higher velocity but also a less turbulent flow loss than the initial rotary gas stream, and such that flow rates of the swirling gas of the first vortex at points in a circumferential direction are more uniform than those of the initial rotary gas stream.

5. The vortex type cold and hot gas separating device of claim 4, wherein a cross-sectional shape, in a flow guiding direction, of each of the curve-shaped flow guiding plates of the radial rectification device is formed by enclosure of an inside curve, an outside curve, and an end connection and transition line, wherein the inside curve is formed by smoothly connecting a segment of elliptic curve, a segment of Witosznski curve, and a segment of straight line located at a gas stream outlet, and the outside curve is formed by smoothly connecting a segment of circular arc curve and a segment of straight line located near the gas stream outlet.

6. The vortex type cold and hot gas separating device of claim 4, wherein the fan is a high-speed fan, and a velocity of gas stream stably outputted by the high-speed fan is in a range of Mach 1/8-Mach 9/10.

7. The vortex type cold and hot gas separating device of claim 1, wherein the vortex return device is disposed to have a gas stream focusing and reflecting surface with a shape of a concave curve, and the hot gas stream discharge port is disposed on a radial outside of the gas stream focusing and reflecting surface in the vortex return device such that when the undischarged remaining gas of the first vortex past the hot gas stream discharge port travels along the gas stream focusing and reflecting surface, a cyclone radius of the remaining gas is gradually reduced, a rotational speed of the remaining gas is gradually increased, a centrifugal force on the remaining gas is enhanced, and the remaining gas is attracted by a negative pressure of a cyclone core of the first vortex, thereby forming the second vortex returning towards the first end of the cylindrical inner chamber through the cyclone core of the first vortex.

8. The vortex type cold and hot gas separating device of claim 7, wherein
the gas stream focusing and reflecting surface is a gas stream focusing and reflecting surface having a shape of a concave paraboloid, a gas stream focusing and reflecting surface having a shape of a concave ellipsoid, or a gas stream focusing and reflecting surface having a shape of a concave sphere.

* * * * *